United States Patent [19]

Nelson et al.

[11] Patent Number: 5,355,126
[45] Date of Patent: Oct. 11, 1994

[54] SELECTIVE CALL SYSTEM INTERACTIVE WITH A WIDE AREA SELECTIVE CALL SYSTEM

[75] Inventors: Leonard E. Nelson, Boynton Beach; Darrell A. Pfeffer, Delray Beach; James A. Wright, Coral Springs, all of Fla.

[73] Assignee: Motorola, Inc., Schaumburg, Ill.

[21] Appl. No.: 918,773

[22] Filed: Jul. 27, 1992

Related U.S. Application Data

[63] Continuation of Ser. No. 563,156, Aug. 6, 1990, abandoned.

[51] Int. Cl.$^5$ .............................................. H04B 7/00
[52] U.S. Cl. ..................... 340/825.440; 340/825.47; 340/825.48
[58] Field of Search ........... 340/311.1, 825.44, 825.47, 340/825.48; 379/56, 57; 455/32.1, 38.1, 38.2, 38.4, 38.5

[56] References Cited

U.S. PATENT DOCUMENTS

| | | | |
|---|---|---|---|
| 4,413,254 | 11/1983 | Pinneo et al. | |
| 4,427,980 | 1/1984 | Fennell et al. | 340/825.44 |
| 4,506,384 | 3/1985 | Lucas. | |
| 4,518,961 | 5/1985 | Davis et al. | 340/825.44 |
| 4,644,347 | 2/1987 | Lucas et al. | 340/825.44 |
| 4,649,538 | 3/1987 | DeLuca et al. | 371/22 |
| 4,739,328 | 4/1988 | Koelle et al. | |
| 4,755,816 | 7/1988 | DeLuca | 340/825.44 |
| 4,782,345 | 11/1988 | Landt. | |
| 4,786,907 | 11/1988 | Koelle. | |
| 4,816,839 | 3/1989 | Landt. | |
| 4,891,638 | 1/1990 | Davis | 340/825.44 |
| 4,910,510 | 3/1990 | Davis et al. | 340/825.44 |
| 5,047,763 | 9/1991 | Kuznicki et al. | 340/825.44 |
| 5,049,875 | 9/1991 | DeLuca et al. | 340/825.44 |
| 5,065,423 | 11/1991 | Gaskill | 379/56 |
| 5,070,329 | 12/1991 | Jasinski. | |

OTHER PUBLICATIONS

*Paging System Planner,* Motorola, Inc., 1989, pp. A-1 to A-12.
*Nedap XS, The Invisible Hands Free Access Control System,* Nedap N.V., Groenlo, The Netherlands, 1989.
*Message Center, Automated Messaging System,* Motorola, 1989.

*Primary Examiner*—Donald J. Yusko
*Assistant Examiner*—John Giust
*Attorney, Agent, or Firm*—Pablo Meles

[57] ABSTRACT

An on-site selective call receiver interacts with a wide area selective call system to increase the probability of timely message reception by a selective call receiver capable of operating in either the wide area or the on-site selective call system. A frequency shifting signal is transmitted from the wide area system in response to addition of the selective call receiver to the on-site registry or automatic detection of entry of the selective call receiver into the on-site selective call system coverage area. The selective call receiver shifts to the wide area frequency in response to detecting that the receiver is out of range of the on-site system signal or in response to a signal transmitted by the on-site system in response to deletion of the receiver from the on-site registry or detection of the exit of the receiver from the on-site coverage area. The on-site system increases message throughput by interleaving data messages with voice messages. The messages broadcast for the selective call receiver by the wide area system are rebroadcast by the on-site system. The messages broadcast by the on-site system, if data messages, are provided to the wide area system for rebroadcast or, if voice messages are stored in a voice mailbox and a "voice message stored in mailbox" message is provided to the wide area system for transmission.

17 Claims, 24 Drawing Sheets

SELECTIVE CALL SYSTEM INTERACTIVE WITH A WIDE AREA SELECTIVE CALL SYSTEM

This is a continuation of application Ser. No. 07/563,156, filed Aug. 6, 1990, now abandoned.

FIELD OF THE INVENTION

This invention relates in general to selective call systems which transmit selective call messages to selective call receivers, and in particular to selective call receivers receiving transmissions from more than one selective call system.

BACKGROUND OF THE INVENTION

The selective call network systems of today have proven to be very effective in reaching people who cannot be tied to a telephone. Selective call network systems are conventionally divided into two types. Some network systems, called wide area network systems, allow for transmission of messages to a large number of users in a large area, such as a metropolitan area. The wide area network systems meet the needs of sales and service people who are constantly on the move within an urban area. With a large number of users, though, the selective call messages must necessarily have a short transmission time, such as comprising an alert plus a short numeric message.

Other network systems designed for persons who are frequently away from their desks, but seldom leave their campus (e.g., the factory, office building, or hospital in which they work) have a localized coverage area, some even solely within one building. These network systems are called local area or on-site selective call network systems and conventionally provide longer voice messages to a smaller number of users who need more information than can be provided in a short numeric message.

Each selective call network system, whether wide area or on-site, is assigned a unique frequency in a manner such that systems proximately located to each other will operate on distinct and separate selective call communications paths or frequencies called channels.

With the proliferation of selective call services, a class of users of selective call receivers has arisen who receive messages on more than one selective call network system. For example, the user subscribes to a wide area network system receiving selective call messages when off campus and subscribes to at least one on-site network system for receiving selective call messages when on campus. Doctors, for instance, may need to be on call when they are off duty and away from the hospital and thus, require the services of a wide area network system. However, when the doctors are on duty at the hospitals, they need the services of an on-site network system.

It is desirable that the reception of a message by a selective call receiver (e.g., a pager) have a high probability of reception. To increase the probability of message reception, a user subscribing to two selective call network systems may use two selective call receivers: one for the wide area network and one for the on-site network. Yet this is expensive and inconvenient. But a single selective call receiver, even if able to receive signals on multiple channels, can only monitor one channel at a time. If the selective call receiver is tuned to an on-site selective call system channel, it cannot simultaneously receive transmissions from the surrounding wide area network system on a different channel. Manual selection of the operating channel is undesirable because of the possibility of missed messages due to nonselection or misselection of channels.

In addition, it is desirable that a user subscribing to two network systems be able to receive selective call messages broadcast from both network systems. If a selective call message is being transmitted for the user by a wide area network system and the user is in a building, there can be difficulty in reception because of the interference of the surrounding building. The selective call receiver may scan between the wide area and on-site channels to increase the probability of message reception. An example of two channel scanning is described in U.S. Pat. No. 4,644,347 assigned to the assignee of the present invention. While a selective call message is being received on one channel, though, the other channel is not scanned. A message transmitted for a user on one channel, therefore, could not be received by the user if he is receiving a message concurrently on another channel.

Thus, what is needed is a network system and a selective call receiver for increased reliability of selective call message reception in both an on-site selective call network system and the surrounding wide area selective call network system operating essentially automatically and permitting the user to receive selective call messages broadcast from one network system while tuned to the channel of the other network system.

SUMMARY OF THE INVENTION

Accordingly, it is an object of the present invention to improve the reliability of selective call message reception.

In furtherance of the above object, it is also an object of the present invention to provide a selective call system which selectively rebroadcasts selective call messages received from another selective call system.

It is another object of the present invention to provide a selective call system which provides a predetermined signal to a selective call receiver to switch frequencies when the receiver is added to or deleted from the selective call system registry.

In carrying out the above and other objects of the invention in one form, there is provided a selective call receiver which switches reception frequencies to a first frequency from a second frequency in response to reception of a first predetermined message. The first predetermined message is transmitted by a second selective call system operating on the second frequency in response to the selective call receiver being added to the registry of a first selective call system operating on the first frequency. The selective call receiver also switches reception frequencies from the first frequency to the second frequency in response to reception of a second predetermined message transmitted by the first selective call system in response to the selective call receiver being deleted from the registry of the first selective call system.

Further, there is provided a method and apparatus for selectively rebroadcasting on a first selective call system selective call messages transmitted from a second selective call system. The selective call messages which are rebroadcast are those messages comprising one of the addresses of selective call receivers which are stored in the registry of the first selective call system. In addition, the selective call messages transmitted by the first selective call system are stored in a memory device from which it can be retrieved via a telephone call to the first selective call system. A message notifying the selective call receiver that the message is stored in the memory device is transmitted by the second selective call system.

BRIEF DESCRIPTION OF THE DRAWING

FIGS. 19K, 19B, 19C, 19D, 19E, and 19F are flowcharts of the operation of the preferred embodiment of a selective call receiver according to the present invention. FIGS. 19B and 19C are a flowchart of the preferred embodiment of an on-site area decode routine of the selective call receiver according to the present invention. FIG. 19D is a flowchart of the preferred embodiment of a voice message subroutine portion of the on-site area decode routine according to the present invention. FIGS. 19E and 19F are a flowchart of the preferred embodiment of a wide area decode routine of the selective call receiver according to the present invention.

DETAILED DESCRIPTION OF THE INVENTION

Figure 1:
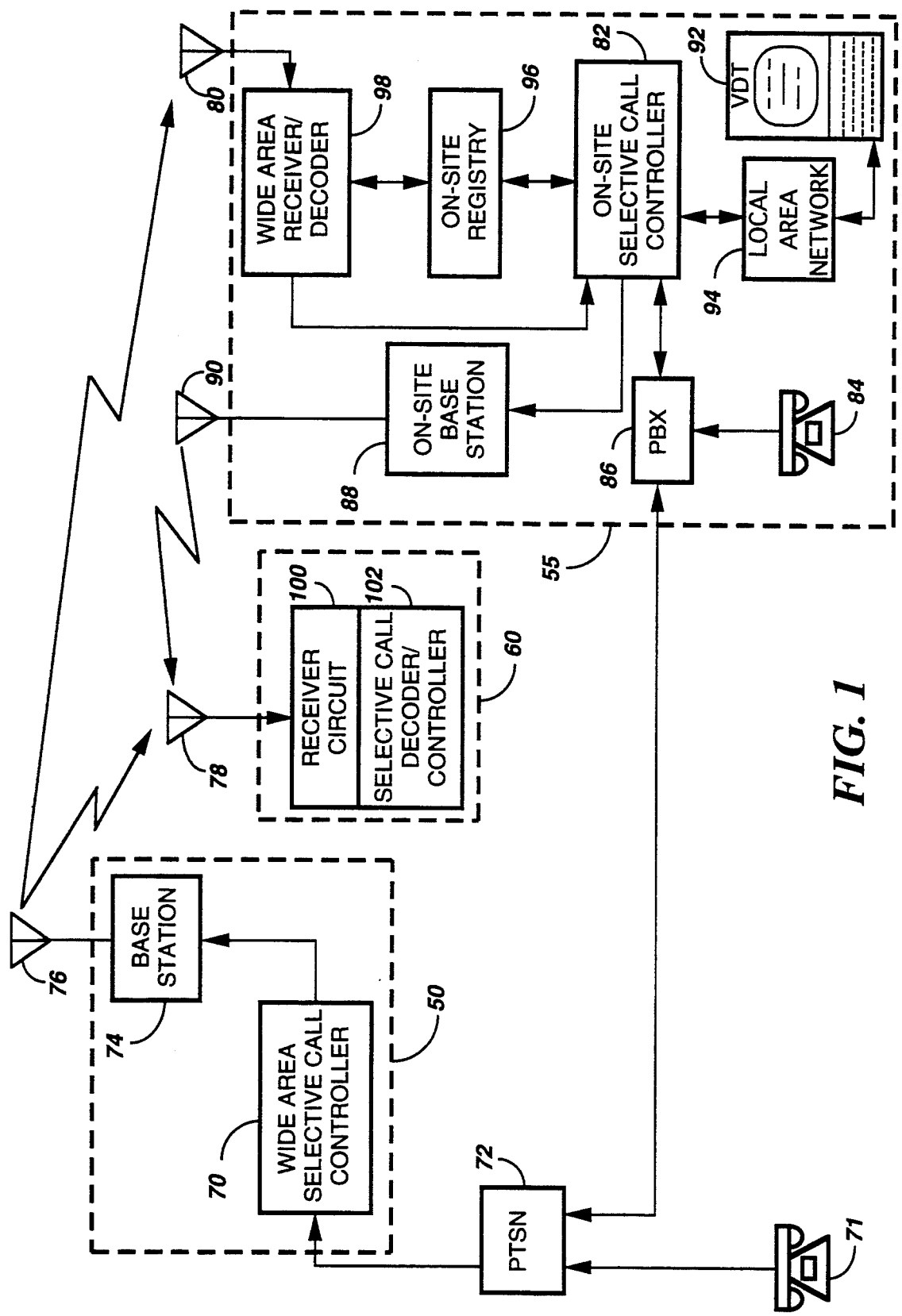
FIG. 1 is a block diagram of an interactive wide area/on-site selective call system according to the present invention.

Referring to FIG. 1, an interactive wide area/on-site selective call network system comprises a wide area selective call system 50, a local or on-site selective call system 55 and at least one selective call receiver 60 capable of receiving transmissions from both the wide area system 50 and the on-site system 55.

The wide area selective call network system 50 comprises a wide area paging controller 70 which receives selective call identification and message information from a message originator via a public phone 71 and the public telephone switch network (PTSN) 72. The controller 70 provides selective call signals to at least one base station 74 in a manner well known to those skilled in the art. The selective call signals are transmitted as radio signals from an antenna 76 coupled to the base station 74. Antennas 78 and 80, coupled to the selective call receiver 60 and the on-site selective call network system 55, respectively, receive the transmitted selective call radio signals from the wide area selective call network system 50.

As is well known to those skilled in the art, an on-site selective call controller 82 receives selective call information from a message originator via a campus phone 84 and an on-site PBX 86. The controller 82 can also receive selective call information from an off-campus message originator via a public telephone 71 coupled through the PTSN 72 to the PBX 86. The on-site selective call controller 82 processes the information from the PBX 86, generating selective call signals which are provided to a base station 88 for transmittal as radio signals to the selective call receivers 60 via a transmitting antenna 90.

An on-site registry 96 is a listing of selective call receivers, by address, which are registered to receive transmissions from the selective call system 55 and is maintained by the on-site selective call controller 82. A message originator may make additions or deletions to the registry 96 via the campus phone 84 or a public phone 71.

In addition, the on-site selective call controller 82 can communicate with video display terminals 92 via a local area network 94. In this manner, an operator utilizing the video display terminal 92 can command the on-site selective call controller 82 to make additions to or deletions from the on-site registry 96 or can input selective call message information to the controller 82.

In the preferred embodiment of the present invention, the on-site selective call controller 82 can provide information to the wide area selective call controller 70 via the PBX terminal 86 and the PTSN 72. The information provided may be selective call information intended for selective call receivers operating on the wide area selective call network system 50 or may be systems switching control signals which would be broadcast by the wide area selective call network system 50 to cause a selective call receiver 60 to switch operating frequencies from a wide area frequency to an on-site frequency.

The on-site system 55 of the present invention further includes a wide area receiver decoder 98 coupled to the antenna 80 for receiving and decoding selective call radio signals from the wide area selective call network system 50. The selective call radio signals are decoded by the wide area receiver decoder 98 and provided to the on-site selective call controller 82 for the operation of the present invention as described below. Briefly, the signals decoded by the wide area receiver decoder 98 are selectively rebroadcast on the on-site selective call network system 55 to a selective call receiver 60 when the selective call receiver 60 is indicated as being within the reception area of the local or on-site selective call network system 55 by virtue of being listed in the on-site registry 96.

Selective call receivers 60 of the present invention are capable of receiving signals transmitted from the wide area selective call network system 50 when programmed to the wide area frequency or channel, and capable of receiving signals transmitted from the on-site selective call network system 55 when the selective call receiver 60 is programmed to the on-site network system frequency or channel. The selective call receiver 60 comprises an antenna 78 for receiving selective call radio signals, a receiver circuit 100, and a selective call decoder/controller 102, as described in more detail below.

Figure 2:
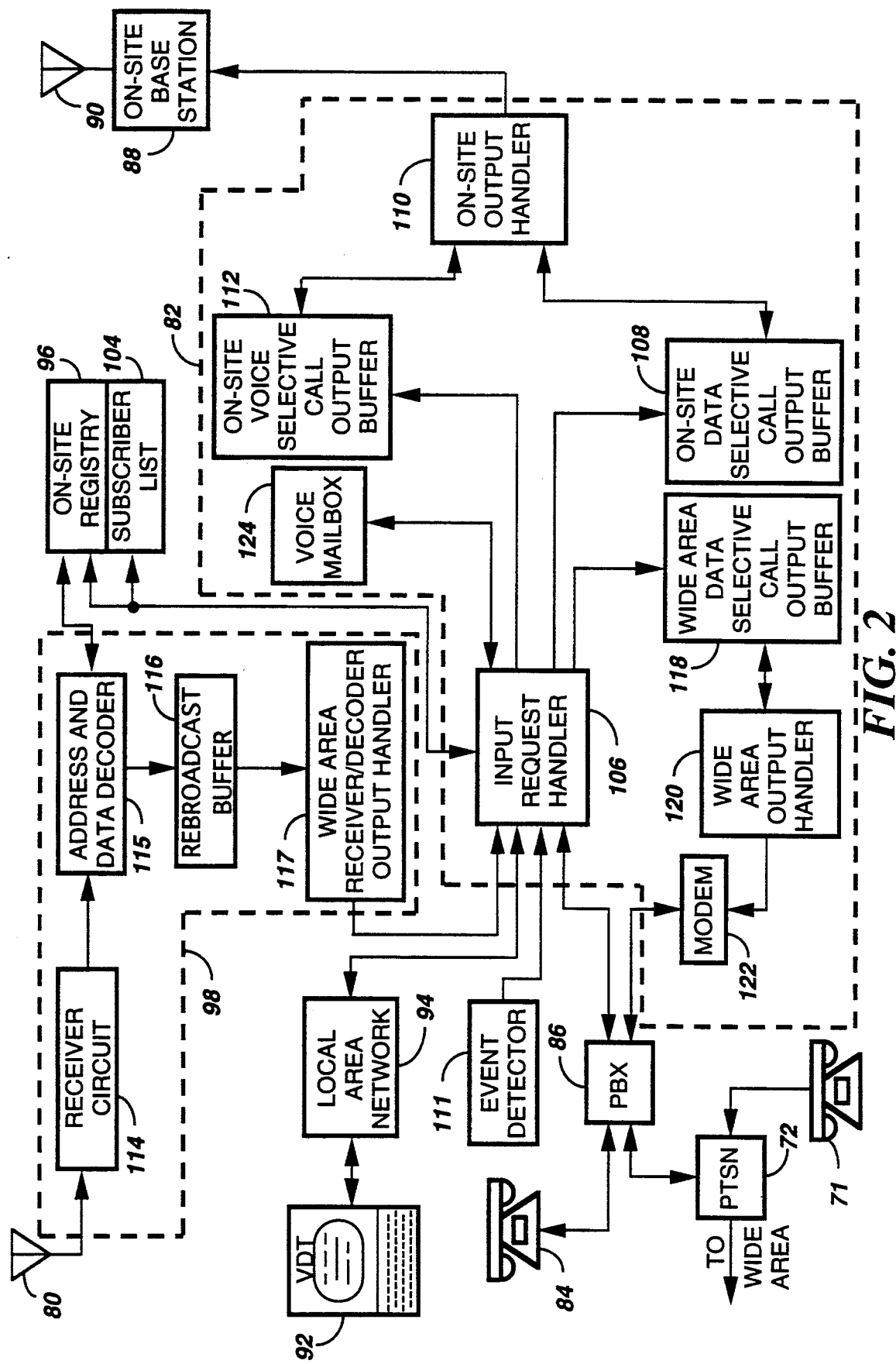
FIG. 2 is a block diagram of a preferred embodiment of an on-site system controller according to the present invention.

Referring next to FIG. 2, the on-site selective call network system 55 includes a subscriber list 104 of all valid on-site selective call receivers and the on-site registry 96 which comprises a listing of the dual system selective call receiver users who are currently registered as being on campus. Registration to or deletion from the on-site registry 96 may be done by a receptionist using the VDT terminal 92 via an input request handler 106. Alternatively, the selective call receiver user may enter an access code via the campus telephone 84 or the public phone 71 which would signal the input request handler 106 to add the user to or delete the user from the on-site registry 96. These registration procedures are conventional procedures presently in use in on-site selective call network systems such as hospitals. An example of an automatic messaging system which provides for these registration procedures is the "Message Center" manufactured by Motorola, Inc. of Schaumburg, Ill.

Automatic update of the information in the on-site registry 96 could also be facilitated by an event detector 111 which detects when the selective call receiver 60 enters or leaves the normal coverage area of the on-site system 55 and signals the occurrence of the event to the input request handler 106. For example, the event detector 111 could be an entry/exit detection device such as the NEDAP XS Hands Free Access Control System manufactured by NEDAP N.V. of Groenlo, the Netherlands. A detection coil mounted at each point of access (entry/exit) to the on-site coverage area, such as a door, could interact with a selective call receiver 60 in order to detect the identity of the selective call receiver 60 when passing through an entry or exit gate of the detection system and forward that identity to the input request handler 106. The input request handler 106 then updates the registry 96 appropriately based upon the identity of the selective call receiver and the indicated function (addition or deletion). The event detector 111 would be especially useful in a hospital or factory setting where the entries and exits could be equipped with gates.

Additions to or deletions from the subscriber list 104 may only be done by a video display terminal operator via the local area network 94.

In any case, when a dual system selective call receiver user is added to or deleted from the on-site registry 96, the selective call receiver 60 (FIG. 1) is reconfigured appropriately. For example, when a dual system user is deleted from the on-site registry 96, the input request handler 106 provides a predetermined selective call message to an on-site data selective call output buffer 108. An on-site area output handler 110 retrieves the predetermined selective call message from the buffer 108 and provides the selective call message to the on-site base station 88 for transmission. The predetermined selective call message, when received by a selective call receiver 60 which has been deleted from the on-site registry 96, will cause the selective call receiver 60 to switch from operating on the on-site selective call network frequency to operating on the wide area selective call network frequency.

When a selective call receiver has been added to the on-site registry 96 by an entry to the video display terminal 92, by the public or campus telephone 71 or 84, respectively, or automatically by the event detector 111, a predetermined selective call message is provided to the wide area data selective call output buffer 118 for transfer to the wide area selective call network system 50. The predetermined selective call message will prompt the wide area selective call network system 50 to send a selective call message to the selective call receiver 60 which will cause the selective call receiver 60 to switch from the wide area network frequency to the on-site network frequency. The selective call message is provided from the wide area data selective call output buffer 118 to the wide area selective call network system 50 via a wide area output handler 120. A modem 122 encodes the information and communicates across the PBX terminal 86 and the public telephone switch network 72 to the wide area selective call network system 50.

In the normal operating mode, a message originator accesses the on-site selective call network system via a campus phone 84. The input request handler 106 detects the ring condition at the telephone input, answers the incoming call, and prompts the message originator for the selective call identification and message information. The message information can be in the form of digital data or voice information. The input request handler 106 digitizes the voice information and combines this information with a selective call receiver address and stores this information in the on-site voice selective call output buffer 112. Digital message information is combined with a selective call address and stored in the on-site data selective call output buffer 108.

The voice and digital selective call messages are serially provided, as determined by the selective call system protocol, to the on-site output handler 110 for transmission to selective call receivers 60 via the on-site base station 88 and the antenna 90. When there is no traffic, the on-site output handler 110 periodically transmits a preamble according to the system protocol to allow the selective call receiver 60 to determine whether it is in range or out of range of the on-site signal.

The antenna 80 receives selective call messages transmitted from the wide area selective call network system 50. The selective call messages are received and demodulated by a receiver circuit 114. An address and data decoder 115 decodes selective call addresses and compares them to the selective call addresses stored in the subscriber list 104 and the on-site registry 96. If it is determined that the decoded address identifies a selective call receiver 60 that is active within the on-site selective call network system 55, the data of the selective call message is decoded, combined with the on-site selective call address of the selective call receiver 60 as identified above, and stored in a rebroadcast buffer 116. A wide area receiver/decoder output handler 117 provides the address and data information stored in the rebroadcast buffer 116 to the input handler 106 for encoding as a selective call message in the on-site selective call network protocol. Thereafter the selective call messages are transmitted as described above. If the signalling protocol used by the on-site network system 55 differs from the protocol used by the wide area selective call system 50, the input request handler 106 will format the decoded message information into the protocol of the on-site system 55.

A voice mail box 124 is included within the on-site selective call controller 82 for storage of voice messages, in digital format, received by the input request handler 106 for a selective call receiver 60 which is registered on campus. If the user leaves the coverage area of the on-site selective call system 55 without deleting his address from the on-site registry 96, or the selective call receiver 60 fails to receive the predetermined selective call message to cause the receiver to switch frequencies when added to the on-site registry 96, the on-site selective call system 55 will nevertheless broadcast messages received for the selective call receiver 60. To improve the probability of message reception, the messages are also stored in the voice mailbox 124 and a predetermined message indicating a message is stored in the voice mailbox 124 is forwarded to the wide area system 50 for broadcast. The selective call receiver user can retrieve the stored voice messages from the voice mailbox 124 by calling up the controller 82 from a public phone 71 or a campus phone 84, as described below. Reception of the predetermined message indicating a stored message in the voice mailbox 124 also informs the user that he must be deleted from the on-site registry 96 or switch to the on-site frequency.

Figure 3:
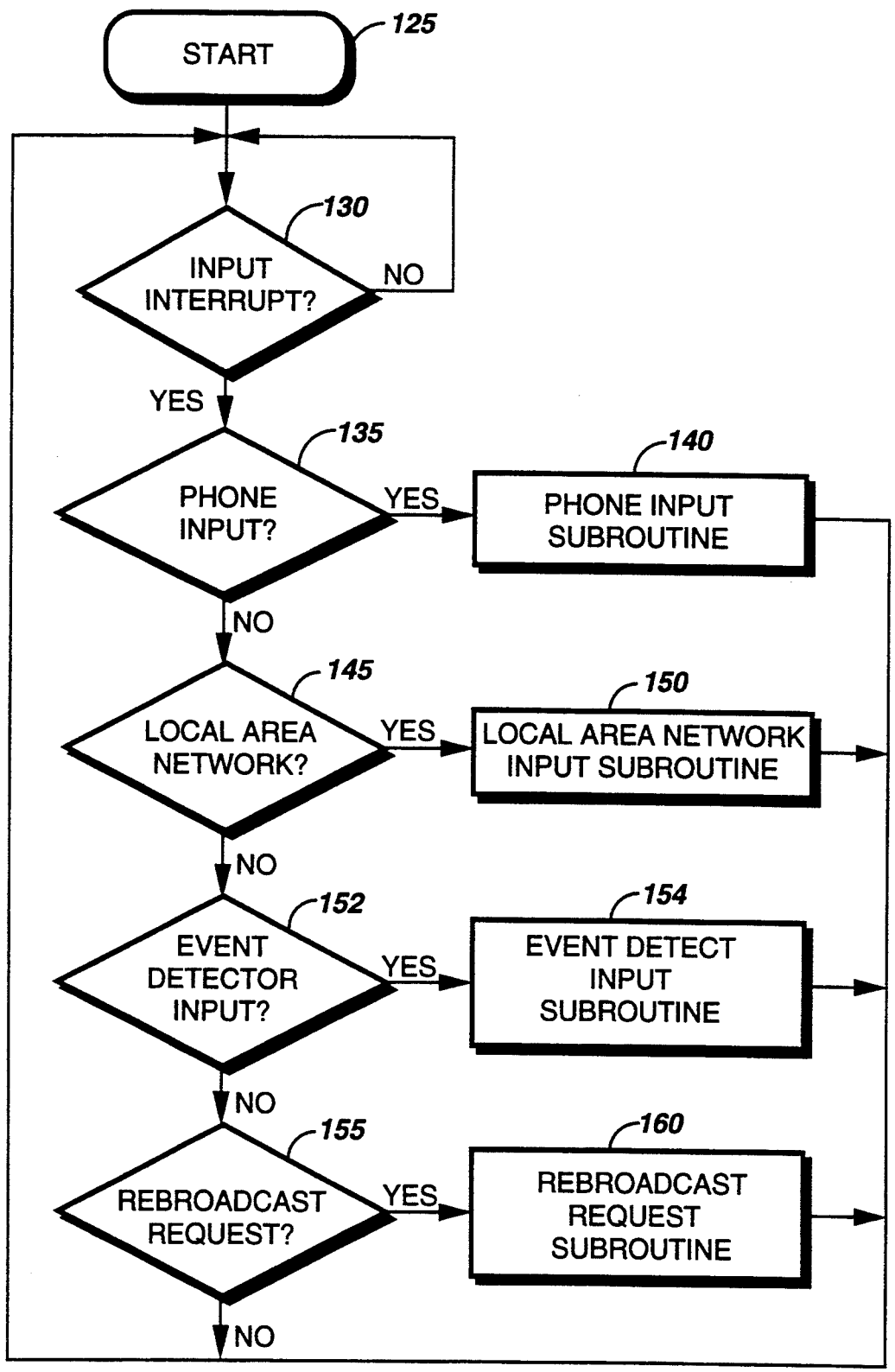
FIG. 3 is a flowchart of the preferred embodiment of the input handler process of the on-site system controller.

Referring next to FIG. 3, the operation of the input request handler 106 starts 125 upon energization of the on-site selective call network system 55. Operation of the input request handler 106 remains in an idle loop as long as there is no input interrupt 130. If there is an input interrupt 130, the input request handler 106 inquires whether the input interrupt is a phone input 135 from a campus phone 84 or a public phone 71 (FIG. 1). If the input interrupt is a phone input 135, the phone input subroutine 140 is performed and operation continues by returning to the idle loop awaiting for the next input interrupt. If the input interrupt is not a phone input 135, operation next determines whether the input interrupt is a local area network input interrupt 145 from the local area network 94. If the input interrupt is a local area network interrupt 145, the local area input subroutine 150 is performed after which operation returns to the idle loop to await the next input interrupt 130. If the input interrupt is not a phone input 135 nor a local area network input 145, operation next determines whether the input interrupt is an event detector input interrupt 152 from the event detector 111 (FIG. 2). If the input interrupt is an event detector input 152, the event detector input subroutine 154 is performed after which operation returns to the idle loop to await the next input interrupt 130. If the input interrupt is not a phone input 135, nor a local area network input 145, nor an event detector input 152, it is determined whether the input interrupt is a rebroadcast request 155 from the wide area receiver/decoder output handler 117. If the input interrupt is a rebroadcast request 155, the rebroadcast request subroutine 160 is performed after which processing returns to the idle loop to await the next input interrupt 130. If the input interrupt is neither a phone input 135, a local area network input 145, an event detector input 152 nor a rebroadcast request 155, processing will return to the idle loop to await the next input interrupt.

Figure 4:
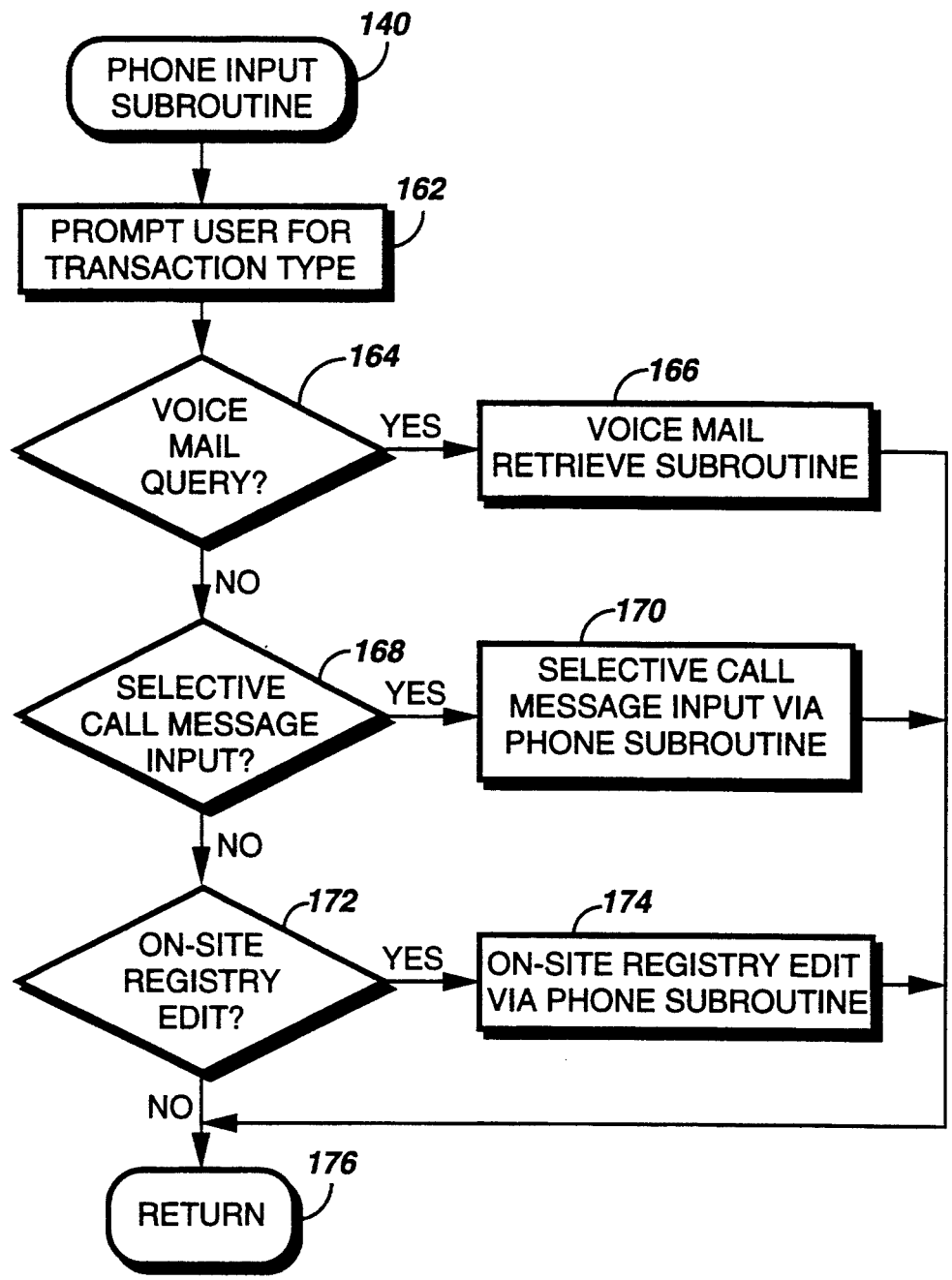
FIG. 4 is a flowchart of the preferred embodiment of the phone input subroutine of the input handler process.
Figure 5:
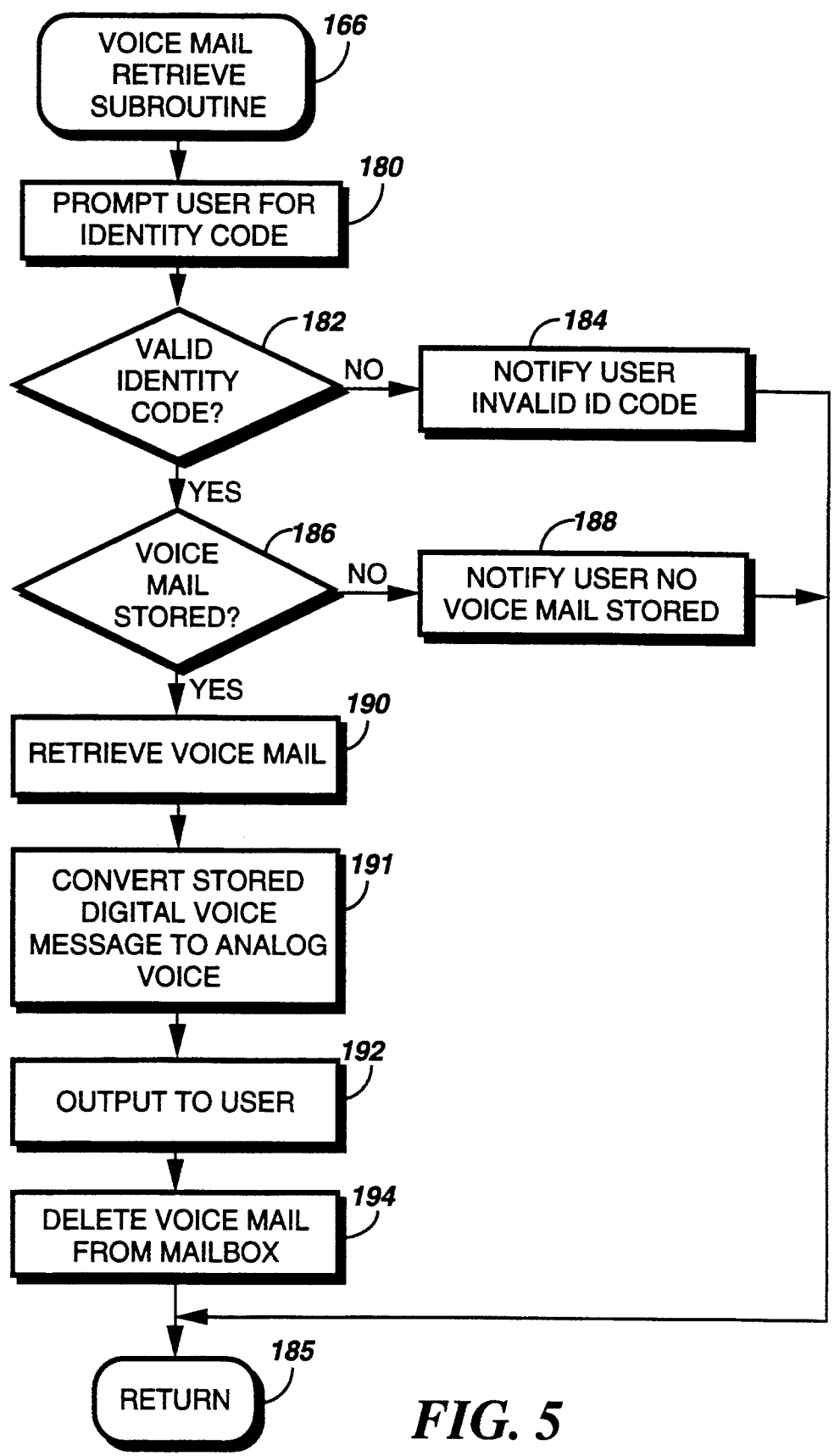
FIG. 5 is a flowchart of the preferred embodiment of the voice mail query subroutine of the phone input handler routine.
Figure 6:
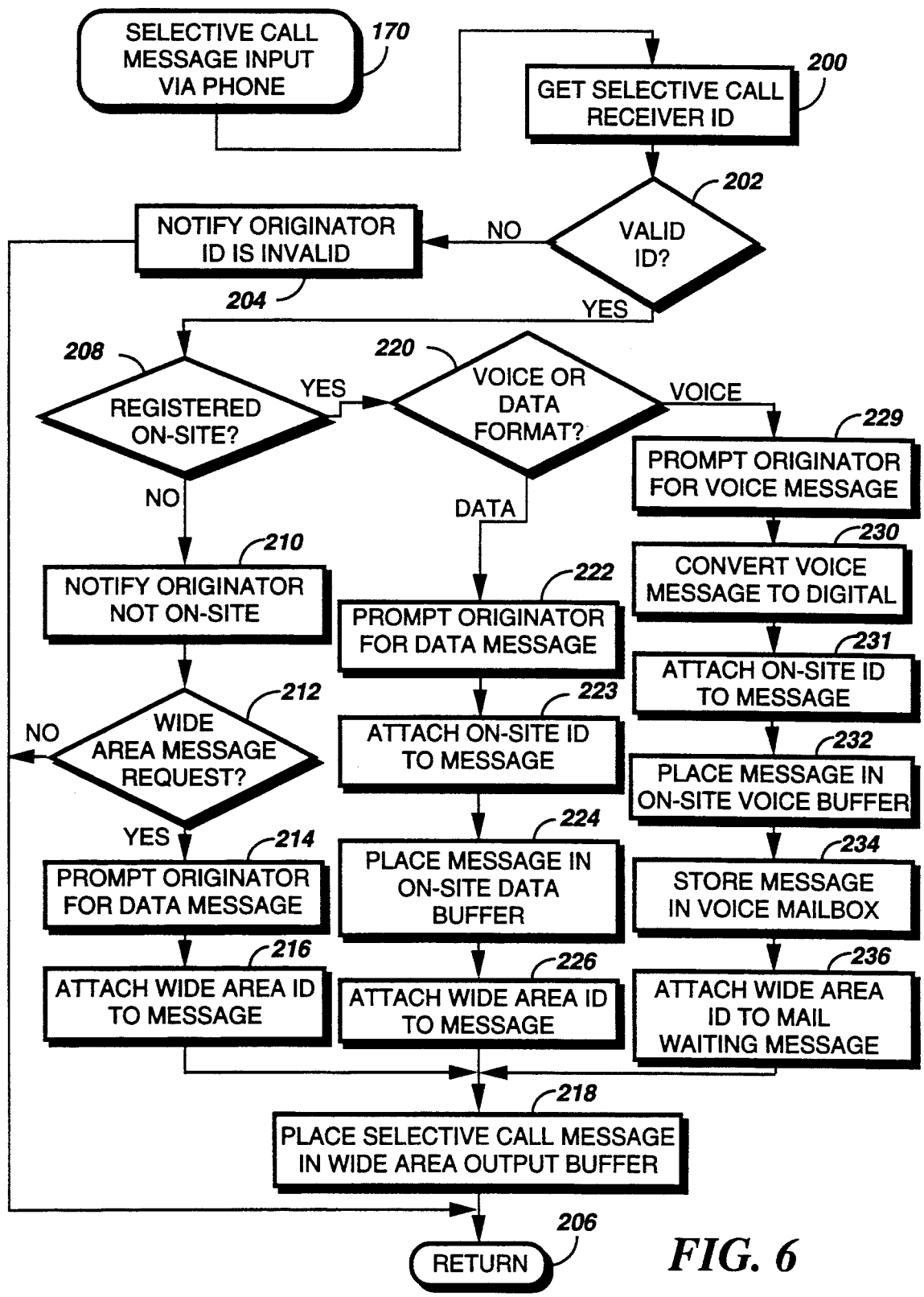
FIG. 6 is a flowchart of the preferred embodiment of the page input via telephone subroutine of the phone input handler routine.
Figure 7:
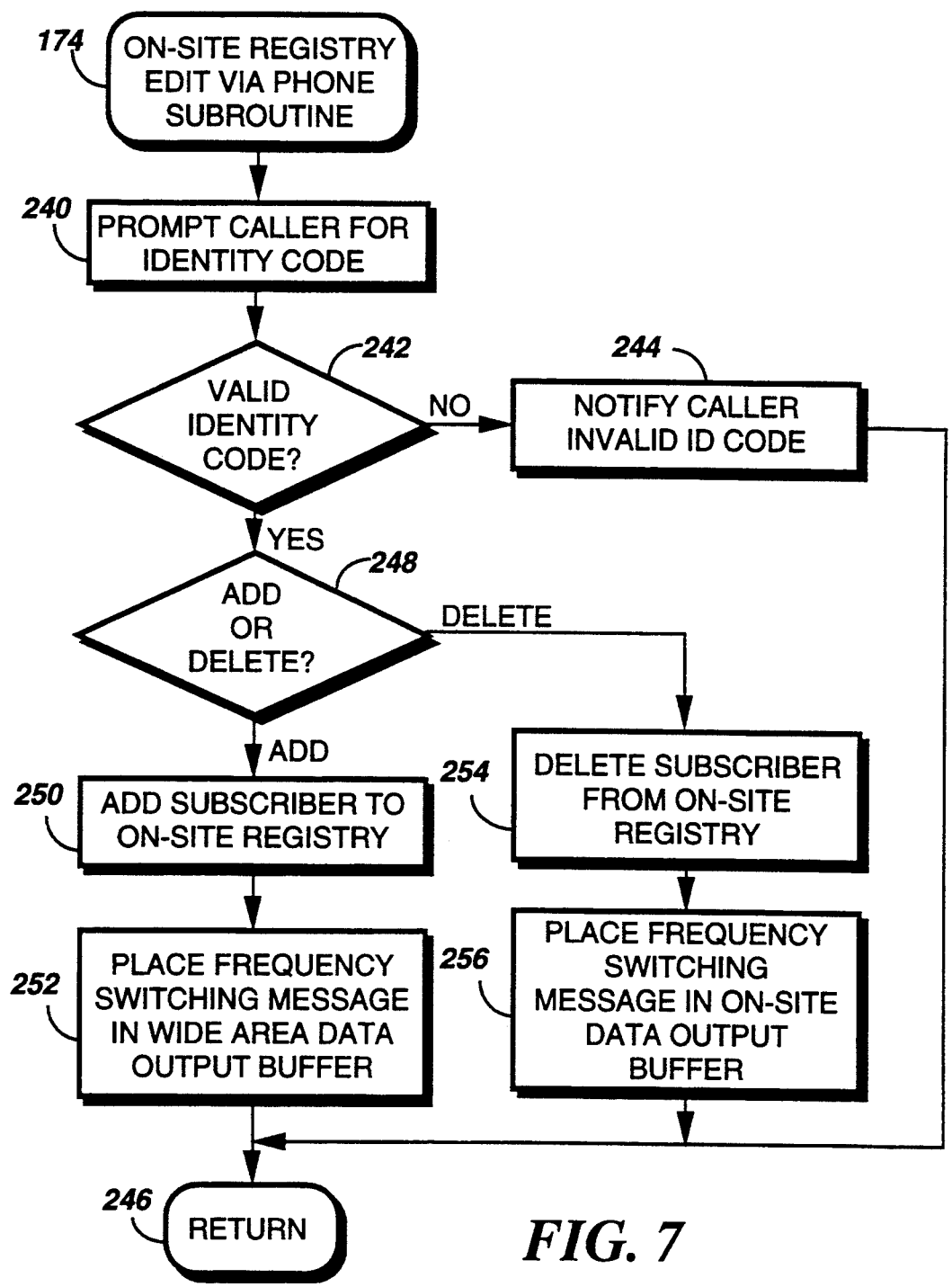
FIG. 7 is a flowchart of the preferred embodiment of the on-site registry via telephone subroutine of the phone input handler routine.

The phone input subroutine 140 is depicted in FIG. 4. When a user contacts the on-site selective call system 55 by telephone (either a campus phone 84 or a public phone 71), initially, the input request handler 106 prompts the user to indicate what type of transaction he wishes to perform 162. According to the preferred embodiment of the present invention, there are three types of transactions the user can perform: first, the user can retrieve voice mail stored in the voice mailbox 124; second, the user can input a selective call message for transmission by the on-site selective call network system 55; or third, the user can add selective call receivers to or delete selective call receivers from the on-site registry 96. If the user's transaction type is a voice mail inquiry 164, a voice mail retrieve subroutine 166 is performed as described below (FIG. 5). If the user's transaction type is not a voice mail query 164, but, instead, is a selective call message input 168, a selective call message input via phone subroutine 170 is performed as described below (FIG. 6). If the user's transaction type is not a voice mail query 164, and is not a selective call message input 168, processing determines whether the user's transaction type is a request to edit the on-site registry 172. If the user's transaction type is an on-site registry edit 172, an on-site registry edit phone subroutine 174 is performed as described below (FIG. 7). Upon completion of the voice mail retrieve subroutine 166, the selective call message input via phone subroutine 170, or the on-site registry edit via phone subroutine 174, or if the user's transaction type is not one of the three proscribed transaction types, processing returns 176 to the completion of the phone input subroutine 140 to await a next input interrupt 130 (FIG. 3).

Referring next to FIG. 5, operation of the voice mail retrieve subroutine 166 begins by prompting the user for an identity code 180. If the code is not a valid identity code 182, the user is notified that the identity (ID) code is invalid 184 and processing returns 185 via return 176 (FIG. 4) to await a next input interrupt 130 (FIG. 3).

If the identity code is valid 182, the subroutine processing determines whether voice mail is stored 186 as identified by the valid identity code. If no voice mail referenced by the user's identity code is stored 186 in the voice mailbox 124 (FIG. 2), the user is notified that no voice mail is stored 188 for the user and processing returns 185 to completion of the voice mail retrieve subroutine 166 (FIG. 4). If voice mail for the user is stored 186 as identified by the user's identity code, the voice mail is retrieved 190 from the voice mailbox 124 by the input request handler 106 (FIG. 2) in digital format. The digital voice message is converted to analog voice 191 and is output (i.e., broadcast over the telephone) to the user 192. The outputted voice mail is then deleted 194 from the voice mail box 124 and processing returns 185 to await the next input interrupt 130 (FIG. 3).

Referring next to FIG. 6, a selective call message originator accesses the input request handler 106 (FIG. 2) to input selective call information. In a conventional manner, the input request handler initially requests and the originator provides 200 the identity of the selective call receiver for which the selective call message is intended. If the information entered as the selective call receiver identity (ID) 200 is not a valid selective call receiver ID 202, the originator is notified that the selective call receiver ID is invalid 204. Processing then returns 206 to await the next input interrupt 130 (FIG. 3).

If the selective call receiver ID is valid 202, processing next determines whether the selective call receiver is registered on-site 208, i.e., determines if the selective call receiver is listed in the on-site registry 96 or the subscriber list 104 (FIG. 2). If the selective call receiver is not registered on-site 208, the originator is notified that the selective call receiver is not on-site 210 and is given the opportunity 212 to provide the selective call information to the wide area selective call controller 70 (FIG. 1) for transmission by the wide area selective call system 50. If the originator indicates to the input request handler 106 that he does not wish to input a wide area selective call message 212, processing returns 206, via return 176 (FIG. 4) to await the next input interrupt 130 (FIG. 3).

Figure 15:
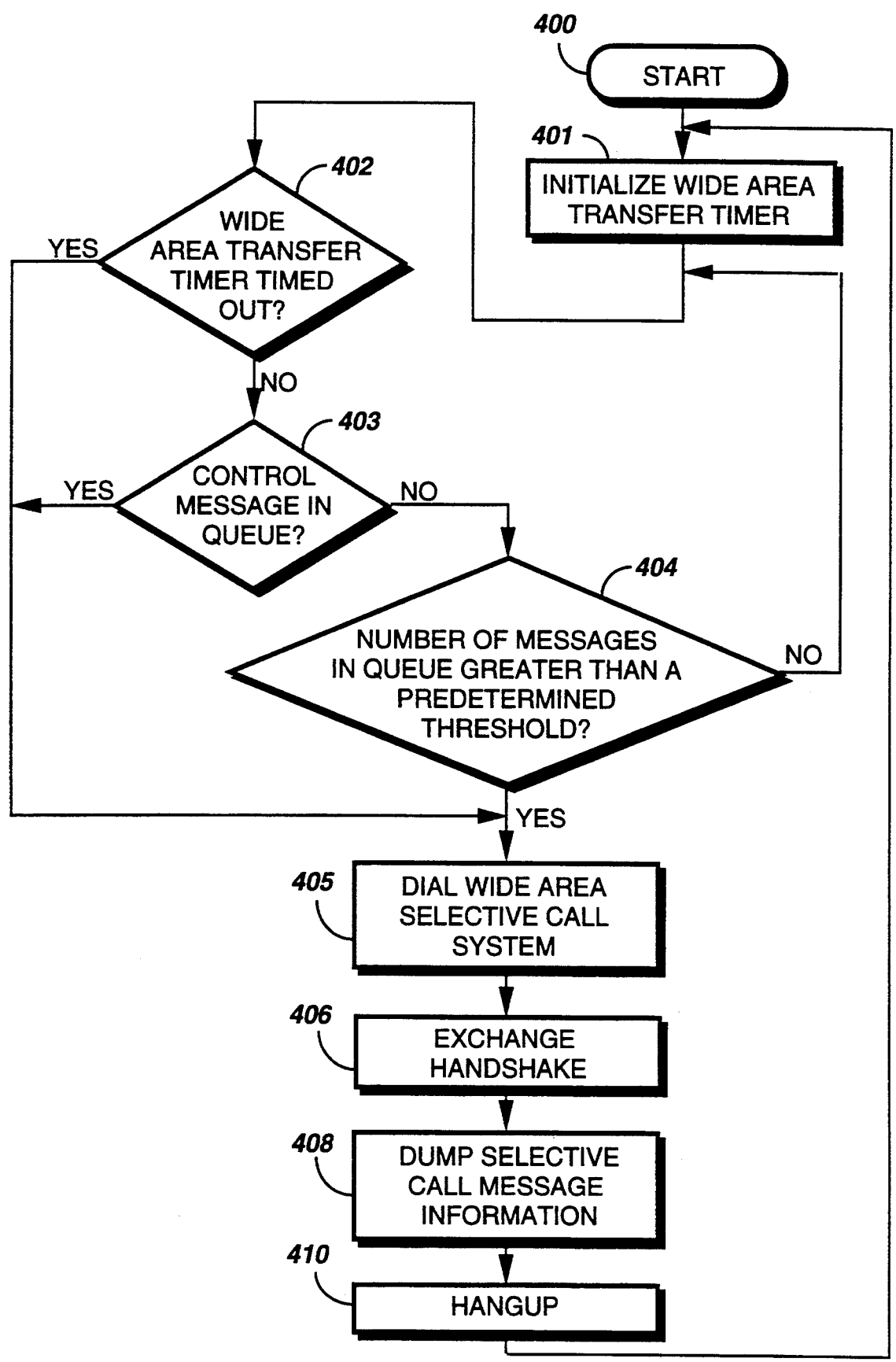
FIG. 15 is a flowchart of the preferred embodiment of the operation of the wide area output handler.

Alternatively, if the originator wishes to input a wide area selective call message 212, the originator is prompted to input the message data 214. After entry of the selective call data, the wide area selective call receiver identity (ID) is attached to the originator's data 216 forming the selective call message. The selective call message is then placed 218 in the wide area output buffer 118 (FIG. 2) for subsequent transmittal to the wide area selective call network system 55 as described below (FIG. 15). Processing then returns 206 to completion of the selective call message input via phone subroutine 180 (FIG. 4).

Figure 14:
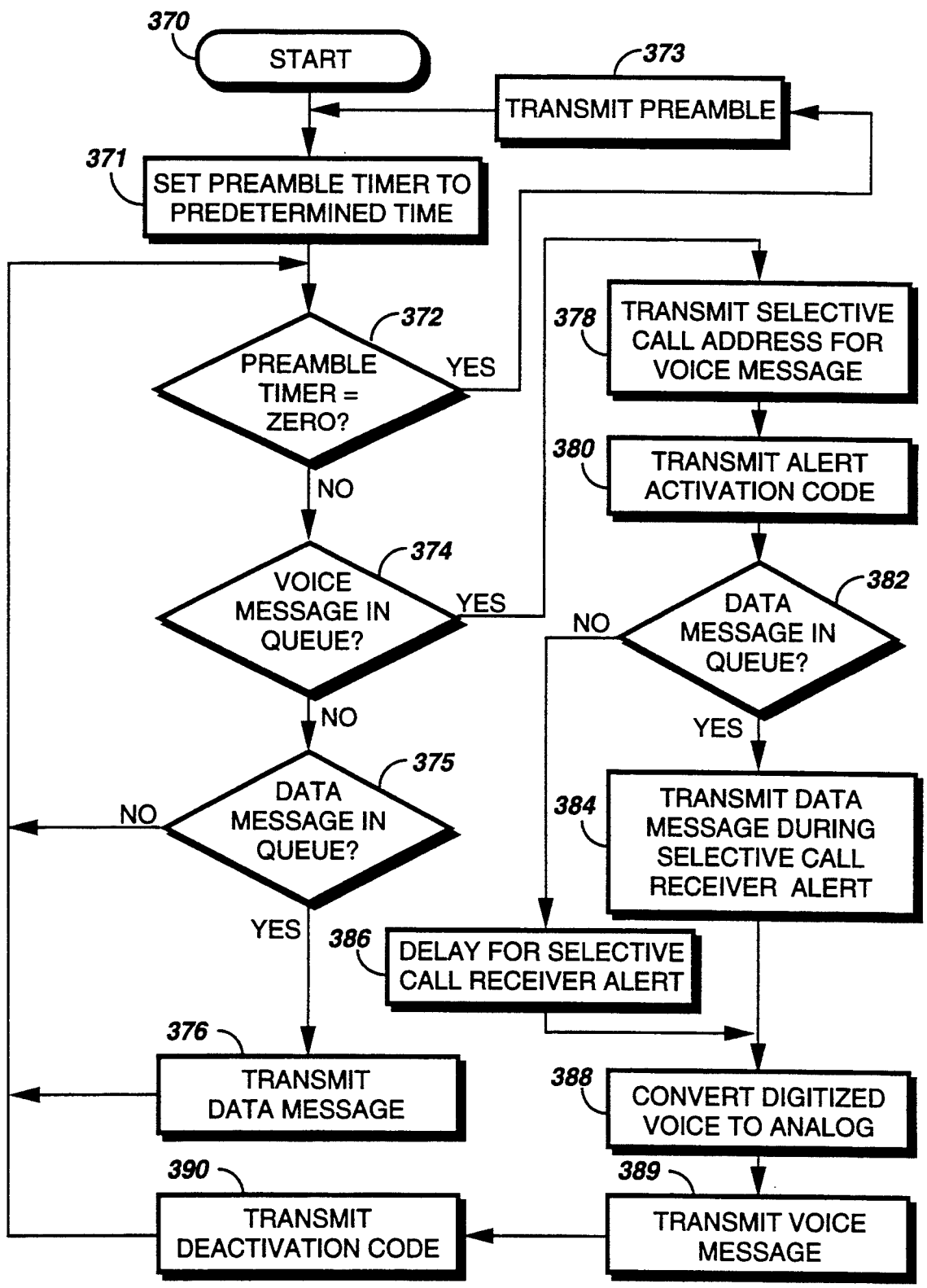
FIG. 14 is a flowchart of the preferred embodiment of the operation of the on-site output handler of the on-site system controller.

If the selective call receiver is registered on-site 208, the originator is queried as to whether the selective call message is a voice format message or a data format message 220. If the selective call message is a data format message 220, the originator is prompted to enter the message data 222. The on-site selective call address (on-site ID) is attached to the message 223 and the selective call address and message are placed 224 in the on-site data selective call message output buffer 108 for subsequent transmittal to the selective call receiver 60 as described below (FIG. 14). The selective call receiver user may have moved from the on-site system coverage to the wide area system coverage, yet the selective call receiver ID has not been deleted from the on-site registry 96. To improve the probability of message reception, the input request handler 106 according to the present invention, attaches the corresponding wide area selective call receiver ID 226 and provides 218 the selective call message to the wide area selective call message output buffer 118 (FIG. 2). The input request handler 106 processing then returns 206 to await the next input interrupt (FIG. 3).

If the selective call message information is in voice format 220, the originator is prompted to input the voice message 229. The voice message is digitized 230 (i.e., the message is converted from analog to digital). The on-site selective call address (ID) is attached to the digitized message 231 and the address and message are placed 232 in the on-site voice selective call output buffer 112 (FIG. 2) for subsequent transmission by the selective call network system 55. To further the object of the present invention to improve the probability of message reception, the voice message is also stored 234 in the voice mailbox 124 (FIG. 2) for subsequent retrieval by a selective call receiver user.

For the selective call receiver who has left the coverage area of the on-site system 55 without deleting the selective call receiver from the on-site registry, yet can receive selective call messages transmitted by the wide area system 50, a standard "mail waiting" or "mail in voice mailbox" message has the wide area selective call receiver ID attached thereto 236 to form a selective call message. The selective call message is then placed 218 in the wide area selective call message output buffer 118 for subsequent provision to the wide area selective call controller 70 (FIG. 1) as described below (FIG. 15). Processing then returns to completion of the selective call message input via phone subroutine 180 (FIG. 4).

Referring to FIG. 7, the on-site registry edit via phone subroutine 174 (FIG. 4) begins by prompting the user for an identity code 240. Additions to and deletions from the on-site registry can only be made by authorized persons possessing an authorized or valid identity (ID) code. If the identity code entered by the caller is not a valid identity code 242, the caller is notified that the ID code is invalid 244 and processing returns 246 to await the next input interrupt 130 (FIG. 3) received by the input request handler 106.

If the identity code entered by the caller is valid 242, it is next determined from the caller-supplied information whether a subscriber is to be added to or deleted from 248 the on-site registry 96. If a subscriber(s) is to be added 248 to the on-site registry 96, a selective call address of or an identification code corresponding to the subscriber is inputted by the caller to the input request handler 106 and the subscriber is added 250 to the on-site registry 96. To accomplish the frequency shifting aspects of the present invention, a frequency switching selective call message comprising the selective call receiver's wide area address is placed 252 in the wide area data selective call output buffer 118 (FIG. 2) for transference to and subsequent transmission from the wide area selective call network system 50 (FIG. 1). The frequency switching selective call message, when received by a selective call receiver 60 receiving messages on the wide area selective call network frequency, causes the selective call receiver 60 to switch from the wide area frequency to the on-site selective call network frequency, as described below (FIG. 19). After the frequency switching selective call message is placed in the wide area output buffer 252, processing returns 246 to await the next input interrupt 130 (FIG. 3) received by the input request handler 106.

If the caller indicates that a subscriber(s) is to be deleted 248 from the on-site registry, the caller identifies the subscriber to be deleted and the subscriber information (either a selective call address(es) or other identification code(s)) is deleted 254 from the on-site registry 96. The subscriber's selective call receiver 60 is then instructed to switch from operating on the on-site frequency to operating on the wide area selective call network frequency by placing 256 a frequency switching selective call message comprising the selective call address of the receiver 60 in the on-site data selective call output buffer 108 (FIG. 2) and subsequently transmitting the selective call message therefrom. When the selective call receiver 60 receives the frequency switching selective call message, the selective call receiver 60 will switch from operating on the on-site frequency to operating on the wide area frequency. Processing of the input request handler 106, after placing the frequency switching selective call message in the output buffer 256, returns 246 to await the next input interrupt 130.

Figure 8:
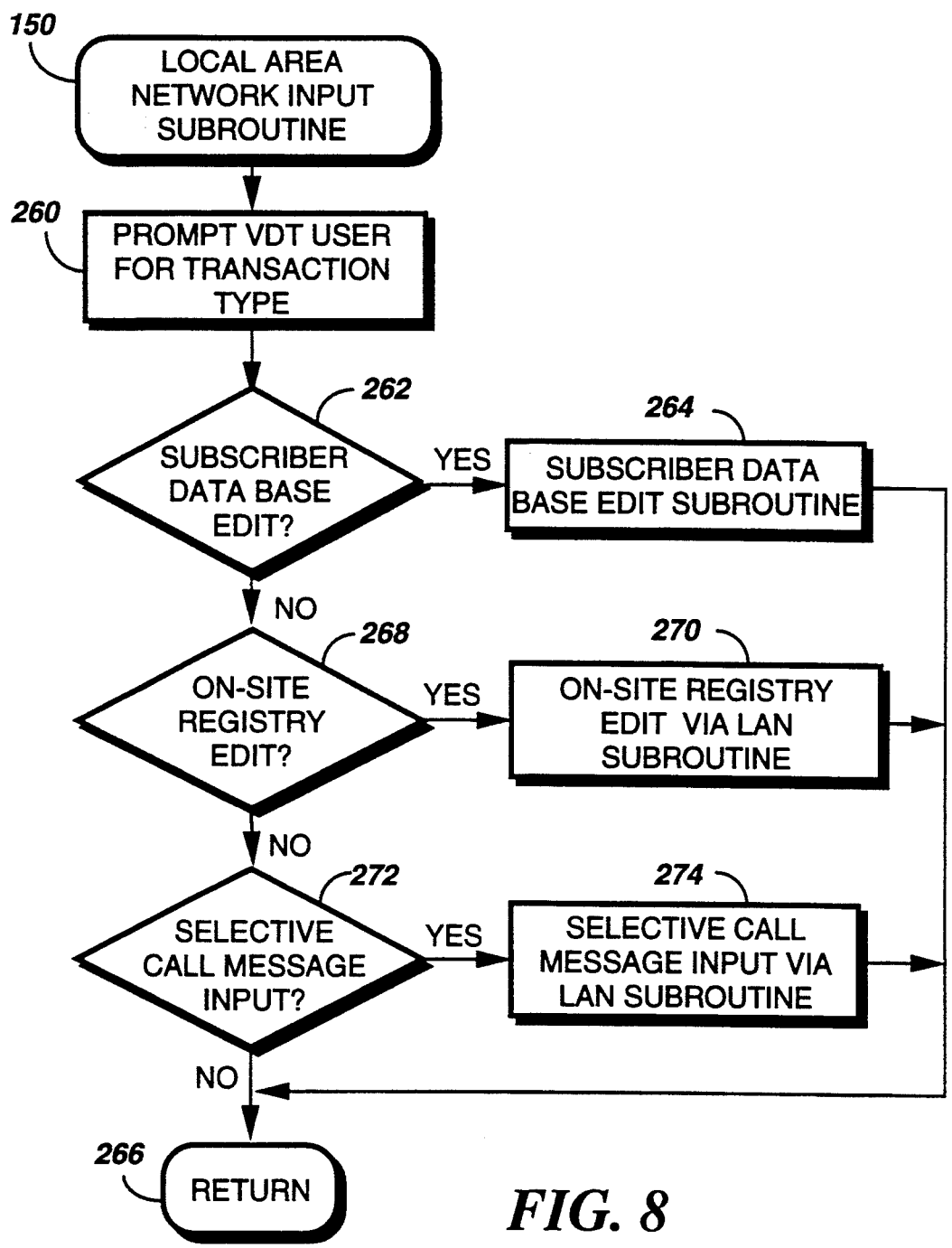
FIG. 8 is a flowchart of the preferred embodiment of the local area network input handler subroutine of the input handler process.

Referring next to FIG. 8, the local area network input subroutine 150 (FIG. 3) is performed by the input request handler 106 (FIG. 2) when receiving inputs from the local area network (LAN) 94 originating from one or more video display terminals 92. Initially, the input request handler 106, after receiving the local area network input interrupt 145, prompts the video display terminal 92 user for the transaction type 260 of input. Three types of input transactions via the local area network are contemplated by the present invention. A video display terminal user may make additions to or deletions from the subscriber data base 262, the VDT user may make additions to or deletions from the on-site registry 268, or the VDT user may input selective call information for transmittal as a selective call message.

If the transaction type is a request to edit the subscriber data base 262, the subscriber data base edit subroutine 264 (FIG. 9) is performed and processing returns 266 to await the next input interrupt 130 (FIG. 3) received by the input request handler 106. If the transaction type is a request to edit the on-site registry 268, the on-site registry edit via local area network subroutine 270 (FIG. 10) is performed and processing returns 266 to await the next input interrupt 130. If the video display terminal 92 user requests to input a selective call message 272, the selective call message input via local area network subroutine 274 (FIG. 11) is performed and processing returns 266 to await the next input interrupt (FIG. 3). Other transaction types could be allowed by additional processing. If the video display terminal 92 user does not indicate any of the proscribed transaction types 262, 268 or 272, the transaction type is invalid and processing will return 266 to completion of the local area network input subroutine 150 (FIG. 3).

Figure 9:
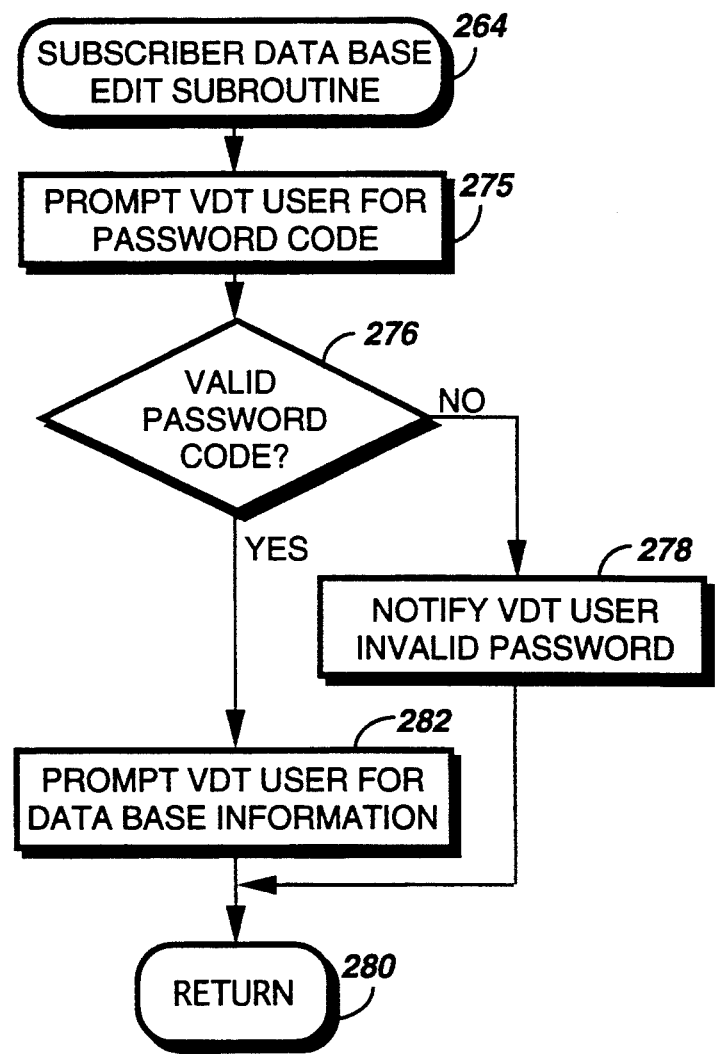
FIG. 9 is a flowchart of the preferred embodiment of a subscriber data base edit subroutine of the local area network transaction handler routine.

Referring to FIG. 9, authorization to make additions to or deletions from the subscriber list or data base, access is strictly regulated through password protection. The subscriber data base edit subroutine 264, therefore, begins by prompting the video display terminal 92 user for a password code 275. If the password code is not valid 276, the video display terminal user is notified 278 and processing returns 280 to await the next input interrupt 130 (FIG. 3). When the VDT user has entered a valid password code 276, the input request handler 106 prompts the VDT user for database information 282 which the input request handler 106 (FIG. 2) will use to edit the subscriber list 104. After inputting all of the data base information, processing returns 280 to completion of subscriber database edit subroutine 264 (FIG. 8) and awaiting the next input interrupt 130.

Figure 10:
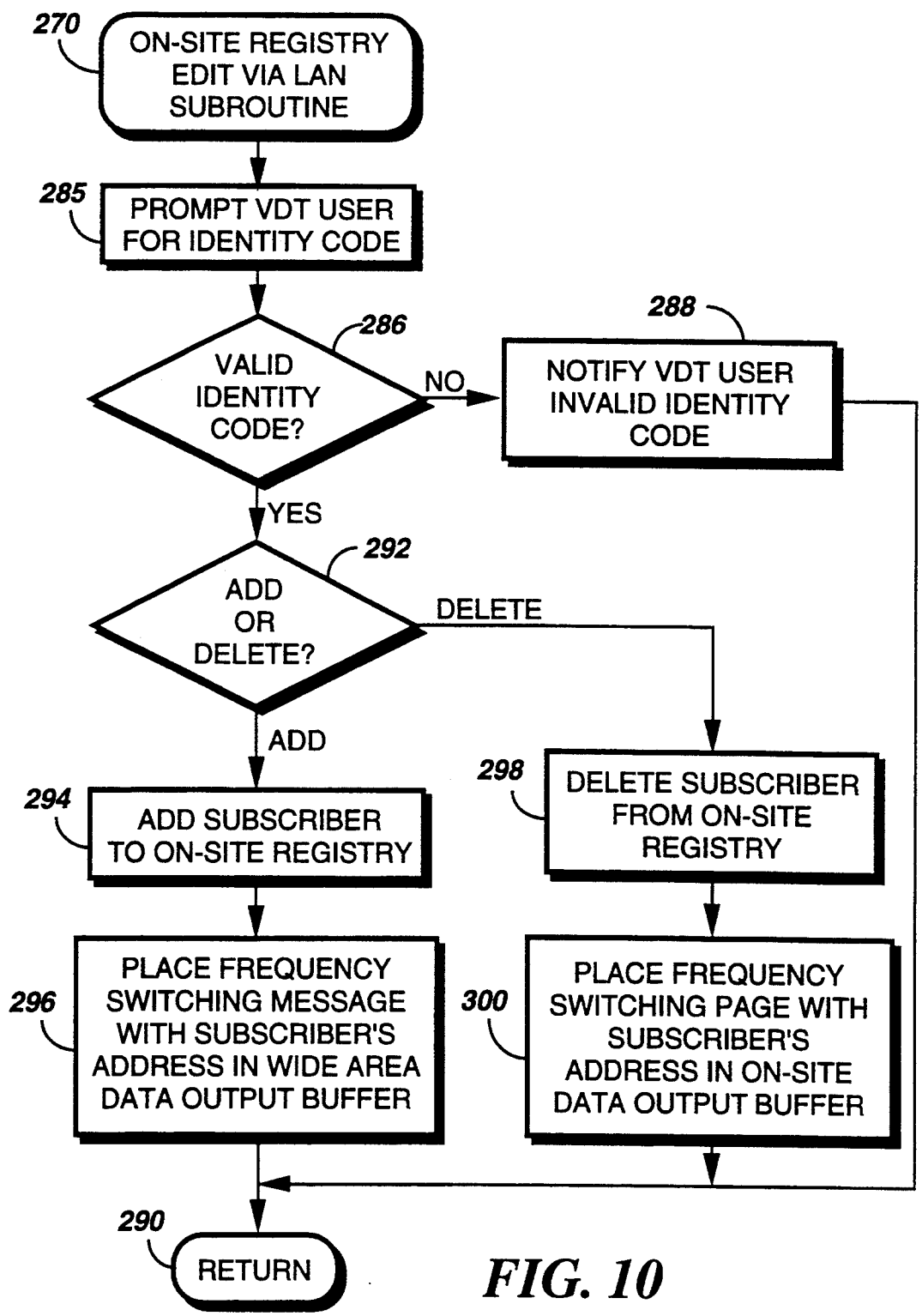
FIG. 10 is a flowchart of the preferred embodiment of an on-site registry edit subroutine of the local area network transaction handler routine.

Referring to FIG. 10, the on-site registry edit via local area network subroutine 270 operates in a like manner to the on-site registry edit via phone subroutine (FIG. 7). Unlike the subscriber data base edit subroutine (FIG. 9), editing of the on-site registry is not password protected. Since the on-site registry 96 comprises a listing of dual system users who are currently registered on-site, access need not be as secure as access to the subscriber list 104. Also, changes to the subscriber list 104 are contemplated to be an uncommon occurrence allowing access to the subscriber list 104 to be limited to few or even one person. Changes to the on-site registry 96, on the other hand, must be made frequently and operation according to the present invention would allow for primarily automatic editing of the on-site registry 96. Thus, operation begins by prompting the video display terminal (VDT) user for an identity code 285, identifying the selective call receiver to be added to or deleted from the on-site registry. If the identity code is not a valid selective call receiver identity code 286 contained in the subscriber data base 104, the VDT user is notified 288 and processing returns 290 to await the next input interrupt 130 (FIG. 3).

If the identity code is a valid selective call receiver identity code 286, the input request handler 106 queries the VDT user as to whether the VDT user wishes to add to or delete a subscriber from 292 the on-site registry 96. To add a subscriber, the input request handler 106 receives from the VDT user the subscriber's selective call address or other identifying code, which the input request handler 106 adds to 294 the on-site registry 96. The input request handler 106 then places 296 a frequency switching selective call message with the subscriber's wide area selective call address in the wide area data selective call output buffer 118 (FIG. 2). The frequency switching selective call message is then provided to the wide area selective call system 50 for transmittal to the subscriber's selective call receiver 60 thereby switching the receiving frequency of the selective call receiver 60 from the wide area frequency to the on-site frequency. Processing of the input request handler 106 then returns 290 to await the next input interrupt 130.

If the video display terminal user wishes to delete 292 a subscriber from the on-site registry 96, this information is entered at the video display terminal 92 and the subscriber is deleted 298 from the on-site registry 96. A frequency switching selective call message is 'then placed 300 by the input request handler 106 in the on-site data output buffer 108 for transmittal to the subscriber's selective call receiver 60 thereby causing the selective call receiver 60 to switch from the on-site frequency to the wide area frequency. Processing then returns to await a next input interrupt 130 (FIG. 3).

Figure 11:
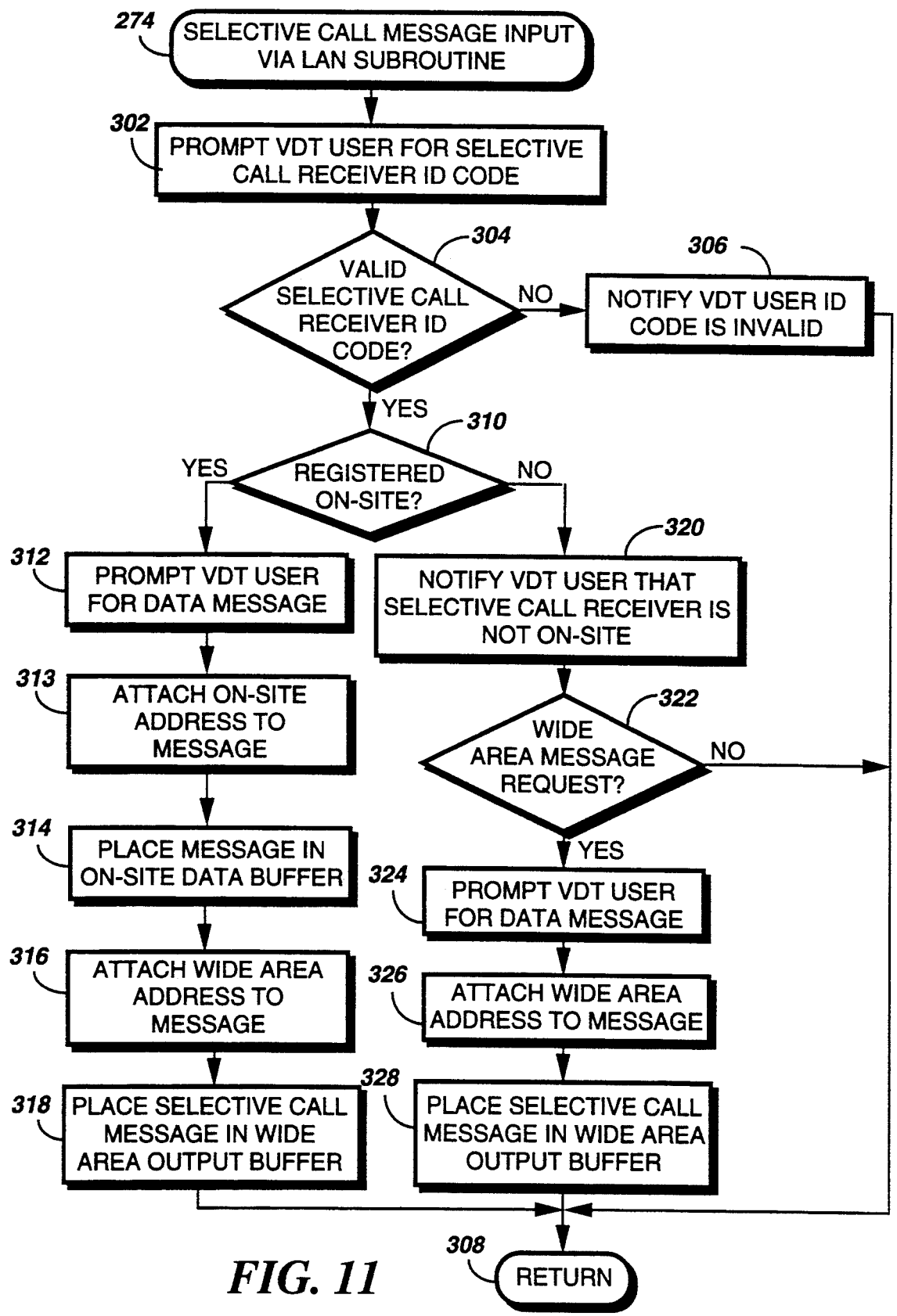
FIG. 11 is a flowchart of the preferred embodiment of a selective call message input via the local area network subroutine of the local area network transaction handler routine.

Referring next to FIG. 11, in addition to entry of selective call messages via a public or campus phone 71 or 84, respectively, selective call messages can be input via the local area network. Since the video display terminal(s) (VDT) 92 can only generate data information and not voice information, the selective call messages inputted via the local area network 94 are limited to data information. The selective call message input via local area network subroutine 274 begins by prompting the VDT user for a selective call receiver identification (ID) code 302. If the inputted selective call receiver ID code is not a valid ID code 304, the VDT user is notified 306 by the input request handler that the ID code is invalid and processing returns 308 to await the next input interrupt 130 (FIG. 3).

If the selective call receiver identification code is valid 304, the input request handler 106 (FIG. 2) determines whether the selective call receiver is registered 310 with the on-site selective call network system 55 (i.e., whether the selective call receiver is listed in the subscriber data base 104 or the on-site registry 96). If the selective call receiver is registered on-site 310, the video display terminal user is prompted 312 to enter the data for the selective call message. When the data message is entered, the input request handler 106 adds the selective call receiver's on-site address to the message data 313 and places 314 the selective call address and message in the on-site data output buffer 108 for subsequent transmission by the on-site selective call system 55. To increase the probability of reception of the message data, the input request handler 106 adds the corresponding wide area selective call address to the message data and changes the selective call message protocol to the wide area system protocol, producing a duplicate selective call message 316 in wide area format. The wide area selective call message is placed 318 in the wide area data selective call output buffer 118 (FIG. 2) and thereafter provided to the wide area selective call system 50 for transmission therefrom. Thus, in accordance with the present invention, data selective call messages inputted to the on-site selective call system 55 are broadcast from both the on-site system 55 and the wide area selective call system 50. After placing the messages in the buffers 314, 318, processing returns 308 to await the next input interrupt 130 received by the input request handler 106.

If the selective call receiver is not registered on-site 310, the VDT user is notified 320 that the selective call receiver is not registered with the on-site selective call system 55. The VDT user is then queried as to whether the VDT user wishes to transmit the selective call message via the wide area selective call network system 322. If the VDT user does not wish to have the selective call message broadcast on the wide area system 322, processing returns to await the next input interrupt 130. On the other hand, if the VDT user requests that the selective call message be broadcast by the wide area selective call network system 322, the VDT user is prompted to enter the selective call data 324. After the user enters the data message 324, the input request handler 106 attaches the wide area selective call address or identification code for the selective call receiver to the data message 326 thereby forming a selective call message for transmission by the wide area selective call network system. The selective call message is converted to the protocol acceptable by the wide area selective call system and the converted selective call message is placed 328 in the wide area output buffer 118 (FIG. 2) for subsequent provision to the wide area system for transmission therefrom. Processing then returns 308 to await the next input interrupt 130.

Figure 12:
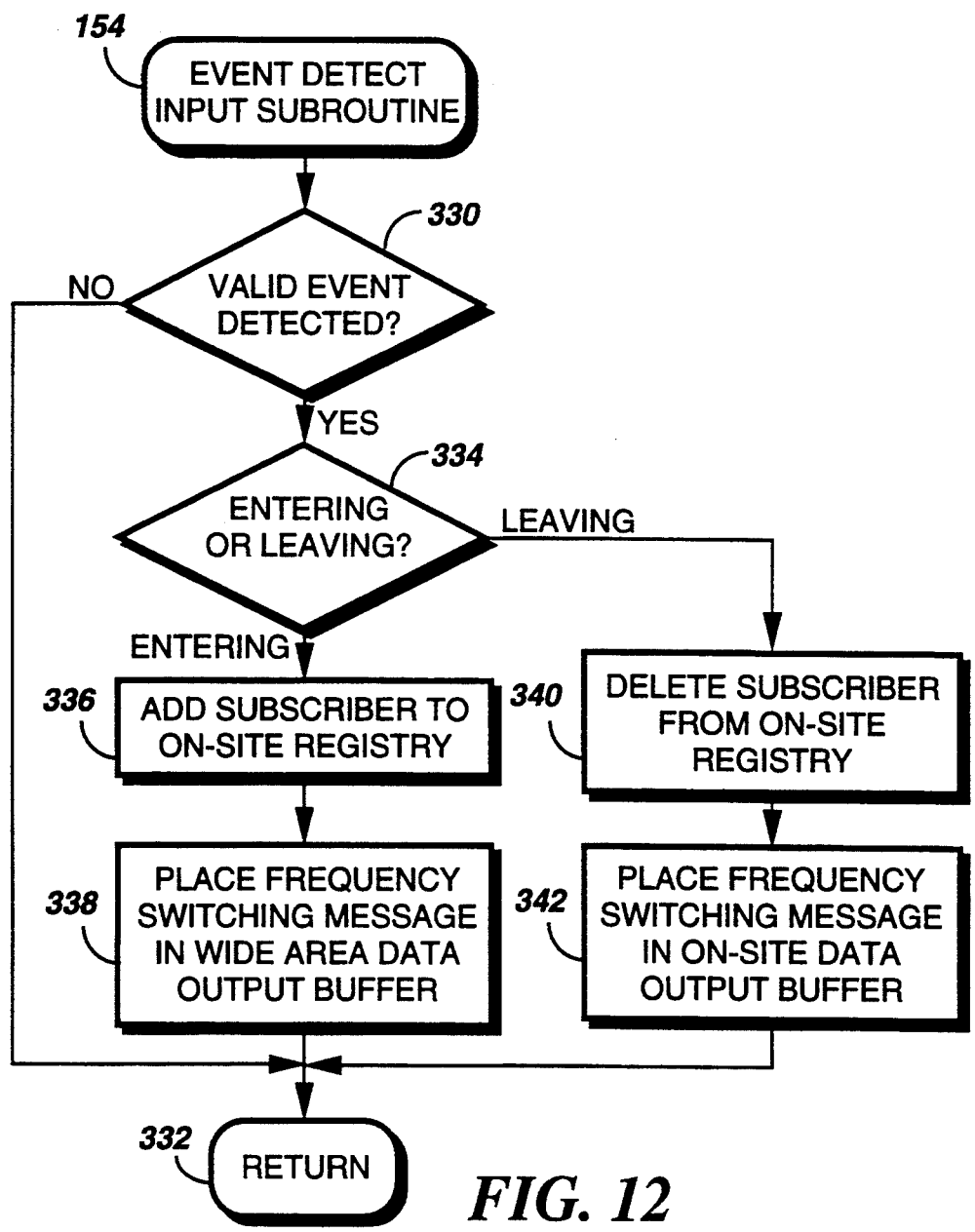
FIG. 12 is a flowchart of the operation of an event detector input subroutine of the input handler process according to the preferred embodiment of the present invention.

Referring next to FIG. 12, the input request handler 106 receives input from the event detector 111 (FIG. 2). In the preferred embodiment of the present invention, the event detector 111 is an entry/exit detection device such as the NEDAP XS Hands Free Access Control System manufactured by NEDAP N.V. of Groenlo, the Netherlands. A detection coil mounted at each point of access to the on-site coverage area, such as a door, interrogates encoded cards and provides a signal in response to the encoding on the cards to the input request handler 106. According to the present invention, the cards will be integrally mounted onto the selective call receiver 60 and will be encoded with a unique code corresponding to the subscriber's identification and/or the on-site selective call address.

Operation of the event detect input subroutine commences with a determination that the event detected was a valid event 330. The input request handler 106 determines an event is valid 330 from the signal received from the event detector 111. A valid event is detection of a dual-operating selective call receiver entering or leaving the on-site system coverage area. If the event detected is not a valid event 330, processing returns 332 to await the next input interrupt 130.

If the event detected is a valid event 330, the input request handler 106 determines from the signal whether the selective call receiver is entering or leaving 334 the on-site system coverage area. If the selective call receiver is entering 334 the on-site coverage area, the selective call receiver subscriber is added 336 to the on-site registry 96 and a frequency switching message including the subscriber's wide area selective call address is provided 38 to the wide area data selective call output buffer 118 (FIG. 2). Alternatively, if the selective call receiver subscriber is detected leaving 334 the on-site coverage area, the subscriber is deleted 340 from the on-site registry 96 and a frequency switching message having the subscriber's on-site selective call address is placed 342 in the on-site data selective call output buffer 108 (FIG. 2). After the frequency switching message is placed in the wide area output buffer 118 or the on-site data output buffer 108, processing returns to await the next input interrupt 130 (FIG. 3).

Figure 13:
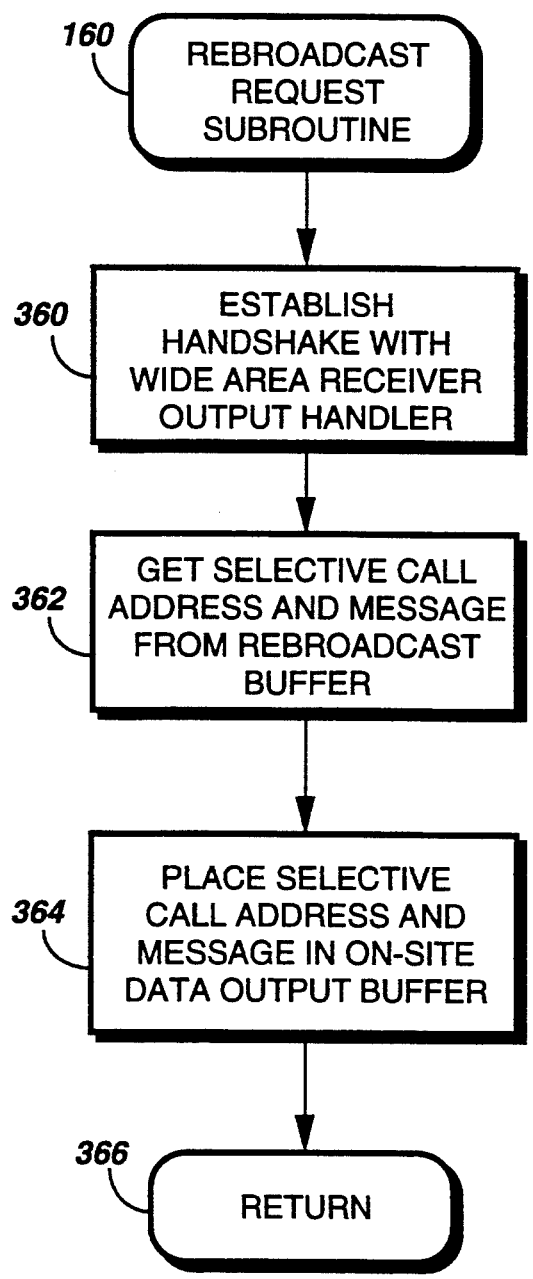
FIG. 13 is a flowchart of the preferred embodiment of a rebroadcast request handling subroutine of the input handler process.
Figure 16:
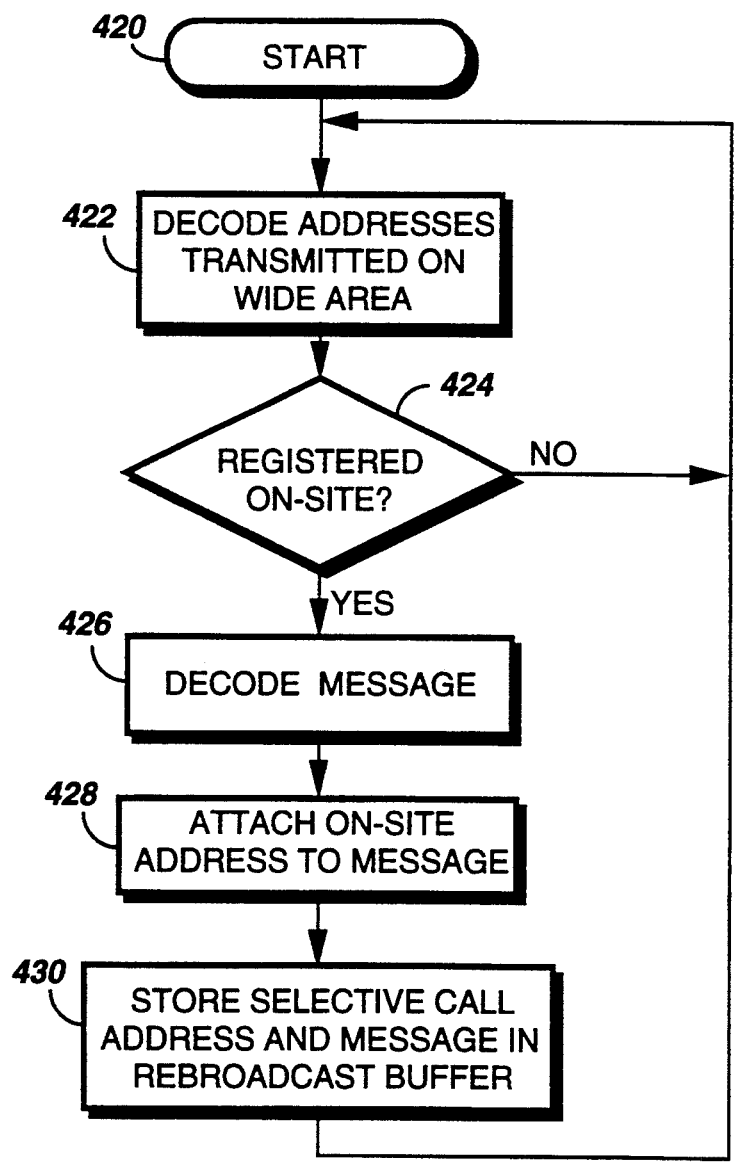
FIG. 16 is a flowchart of the preferred embodiment of the operation of the address and data decoder of the wide area receiver decoder.

Referring next to FIG. 13, operation of the rebroadcast request subroutine 160 is initiated by a rebroadcast input interrupt 155 (FIG. 3) received by the input request handler 106 from the wide area receiver/decoder output handler 117 (FIG. 2). First, the input request handler 106 establishes handshake 360 with the wide area receiver/decoder output handler 117. Once handshake is established 360, the input request handler 106 retrieves selective call messages comprising addresses and data messages 362 from the rebroadcast buffer 116 (FIG. 2). The selective call messages stored in the rebroadcast buffer comprise a portion of the selective call messages transmitted by the wide area selective call system 50 and received by the wide area receiver/decoder 98 (FIG. 1) selected in accordance with the present invention as described below (FIG. 16). The input request handler 106 then places the selective call messages 364 in the on-site data selective call output buffer 108 (FIG. 2) for subsequent transmittal by the on-site selective call network system. Processing then returns 366 to await the next input interrupt 130 (FIG. 3).

Referring next to FIG. 14, operation of the on-site output handler 110 (FIG. 2) starts 370 when the on-site selective call network system is energized. A preamble timer is initialized to a predetermined time 371 to insure that a preamble is transmitted at least once during the predetermined time for operation of the battery save function and the out of range detect function of the selective call receiver 60 as described below (FIG. 19). When the preamble timer timeouts to zero 372, the preamble is transmitted 373 and processing returns to reinitialize the preamble timer 371. Thus, in the absence of a data or voice message, the preferred embodiment of the present invention periodically inserts a predetermined preamble in the stream of information received by the base station 88 in a conventional manner as defined by the on-site signalling protocol.

If the preamble timer has not timed out 372 and if a voice selective call message is not in queue 374 (i.e., if no voice selective call messages are stored in the on-site voice output buffer 112 (FIG. 2)) the on-site output handler 110 determines whether a data selective call message is in queue 375 (i.e., stored in the on-site data output buffer 108 (FIG. 2)). If neither a voice selective call message is in queue 374 nor a data selective call message is in queue 375, processing remains in an idle loop awaiting timeout of the preamble timer 372 or a voice message 374 or a data message 375 to be placed in queue. If no voice message is in queue 374 but a data selective call message is in queue 375, the data selective call message is transmitted 376 via the on-site base station 88 and the antenna 90 (FIG. 1) in a conventional manner.

If a voice selective call message is in queue 374, the selective call receiver address stored with the voice selective call message in the on-site voice output buffer 112 is transmitted 378 followed by transmission of the alert activation code 380. As is well known to those skilled in the art, when transmitting a voice message to a selective call receiver the address and alert activation code are transmitted followed by a delay of a predetermined time duration to allow the selective call receiver to broadcast an alert notifying the user to listen for the subsequently broadcast voice message. The on-site selective call controller improves selective call message throughput by transmitting data selective call messages intended for other selective call receivers during the delay time between transmission of an address and activation code and transmission of the accompanying voice message in a manner such as that described in U.S. Pat. No. 4,427,980. To accomplish this throughput improvement, if a data selective call message is in queue 382 after transmission of the alert activation code 380, the data selective call message is transmitted 384 during the delay reserved for the selective call receiver's voice message alert. In this manner, the transmission delay time during selective call receiver alert is utilized to transmit data selective call messages. If a selective call message data is not in queue 382, the on-site output handler delays transmission of the voice message to accommodate the selective call receiver's alert in a manner well known in the art 386. After the delay 386, or after transmission of the data message 384, the digitized voice message stored in the on-site voice output buffer is converted to an analog voice message 388 and the voice message is transmitted 389 followed by transmission of the deactivation code 390.

After transmission of the deactivation code 390 which completes transmission of the voice message, or after transmission of the data selective call message 376, processing returns to the idle loop to await timeout of the preamble timer 372 or detection of a voice message 374 or data message 375 stored in the voice output buffer 112 or the data output buffer 108, respectively. The on-site output handler provides the queued information to the on-site base station 88 for transmission. The selective call messages combined with the preamble are serially transmitted via the antenna 90.

Referring to FIG. 15, the communication with the wide area selective call system 50 via the wide area output handler 120 (FIG. 2) starts operation 400 when the on-site system is energized. Since wide area network systems typically have heavy traffic, the present invention is designed to minimize communication between the on-site selective call network system 55 and the wide area selective call network system 50. In accordance with the present invention, therefore, a wide area transfer timer is initialized 401 to a value sufficient for periodic transfer of messages to the wide area system. In the preferred embodiment of the present invention, the timer is initialized 401 to five minutes.

If the wide area transfer timer has not timed out 402, processing determines whether a control message is in queue 403. To minimize the wait for a control message to be broadcast, particularly a frequency switch control message, if a control message is stored 403 in the wide area data selective call output buffer 118, the messages stored therein are immediately transferred to the wide area selective call system 50 as described below.

In accordance with the present invention, a predetermined threshold is established for the number of selective call messages stored in the wide area data output buffer 118 (FIG. 2). In the preferred embodiment, the predetermined threshold is twenty stored messages. If the timer has not timed out 402 and there are no control messages in queue 403 and the number of selective call messages stored in the buffer 118 is less than the threshold 404, operation of the wide area output handler 120 remains in an idle loop until either the timer times out 402, a control message is in queue 403 or the number selective call messages in queue (i.e., stored in the wide area data output buffer 118) becomes greater than the predetermined threshold 404.

To transfer messages stored in the buffer 118 to the wide area selective call system in response to a positive determination of steps 402, 403 or 404, the wide area output handler 120 dials up 405 the wide area selective call system controller 70 by supplying the necessary instructions to the modem 122 (FIG. 2). When the wide area output handler 120 is telephonically connected to the wide area system controller 70, the wide area output handler 120, in a manner well known in the art, exchanges handshake 406 with the wide area controller 70 to synchronize thereto. The output handler 120 then dumps 408 the selective call messages stored in the wide area data output buffer 118 to the wide area selective call controller 70 in a manner well known to those skilled in the art. One scheme for communication and transfer of information between selective call networks is described in Appendix A of "Paging System Planner" published by Motorola, Inc. of Boynton Beach, Fla. The operation of the wide area output handler 120 then instructs the modem 122 to hang up 412 and processing returns to reinitialize the wide area transfer timer 401 and await timer timeout 402, a control message in queue 402 or the number of messages stored in the wide area output buffer 118 to next exceed the predetermined threshold 404 in the wide area output handler idle loop.

Referring next to FIG. 16, the operation of the wide area address and data decoder 115 (FIG. 2) starts 420 upon energization of the on-site selective call system 55. All addresses received on the wide area frequency by the antenna 80 and the demodulated by the receiver circuit 114 are decoded 422 by the address and data decoder 115. The address and data decoder 115 then determines 424 whether the decoded address is a wide area selective call address of a dual system selective call receiver registered on-site (i.e., the decoded address is compared to the wide area addresses stored in the on-site registry 96). If the selective call receiver having the decoded address is not registered on-site 424, processing returns to decode the next address transmitted on the wide area selective call network system 422.

If the address decoded is the wide area address of a selective call receiver registered on-site 424, the selective call message is decoded 426. The on-site selective call address is attached 428 to the message data and the selective call message is stored 430 in the rebroadcast buffer 116. Processing then decodes the next address 422.

Figure 17:
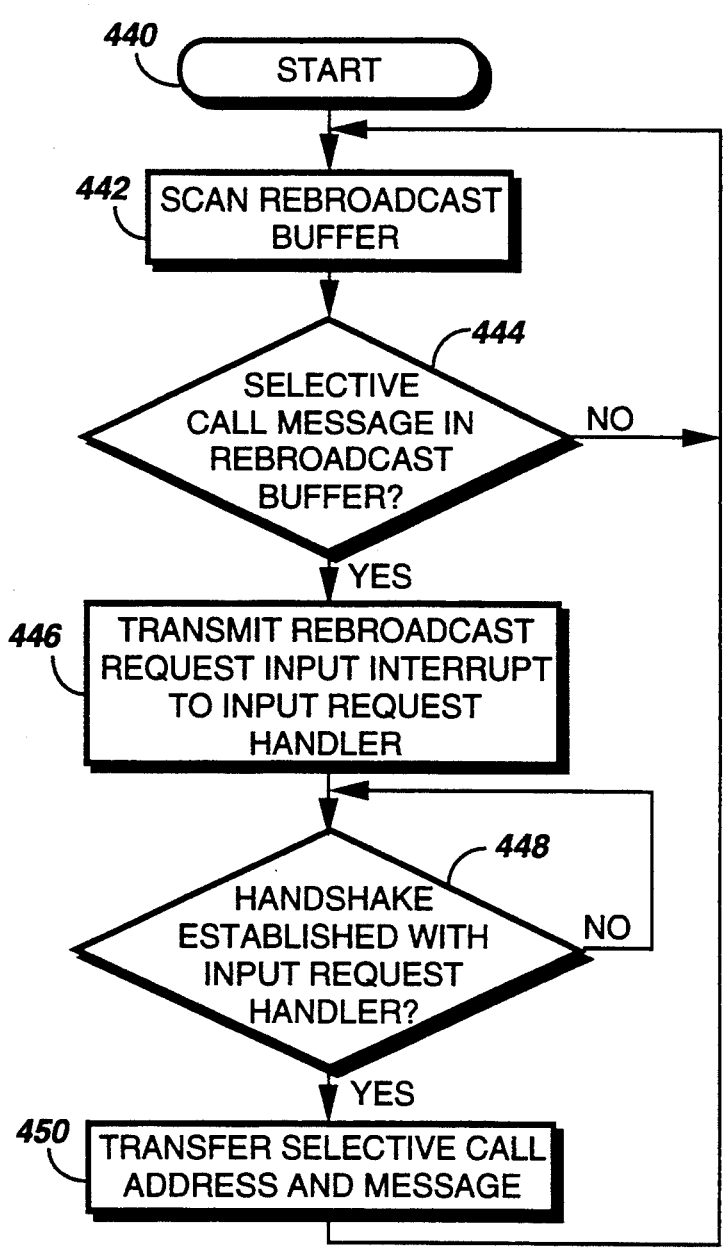
FIG. 17 is a flowchart of the preferred embodiment of the operation of the wide area receiver/decoder output handler of the wide area receiver/decoder.

Referring to FIG. 17, operation of the wide area receiver/decoder output handler 117 (FIG. 2) starts 440 upon energization of the selective call on-site network system 55. The rebroadcast buffer 116 is scanned 442 by the output handler 117 to determine 444 whether a selective call message(s) is stored therein. If a selective call message is not stored in the rebroadcast buffer 444, processing remains in an idle loop until the rebroadcast buffer 116 is scanned 442 and found to have selective call messages stored therein 444.

When a selective call message is determined to be stored in the rebroadcast buffer 444, the output handler 117 transmits a rebroadcast request input interrupt 446 to the input request handler 106. When the input request handler receives a rebroadcast request input interrupt 155, the rebroadcast request subroutine is performed 160 (FIG. 3). In order to perform the rebroadcast request subroutine 160 (FIG. 13) requiring the transfer of data, the wide area receiver/decoder output handler 117 must necessarily be synchronized (i.e., handshake established) with the input request handler 106 (FIG. 2). If handshake is not established with the input request handler 448, processing idles until handshake is established 448. When handshake is established 448, the selective call messages and corresponding addresses stored in the rebroadcast buffer 116 are transferred 450 to the input request handler 106 in accordance with the rebroadcast request subroutine 160 (FIG. 13). Processing then returns to scan 442 the rebroadcast buffer 116.

Figure 18:
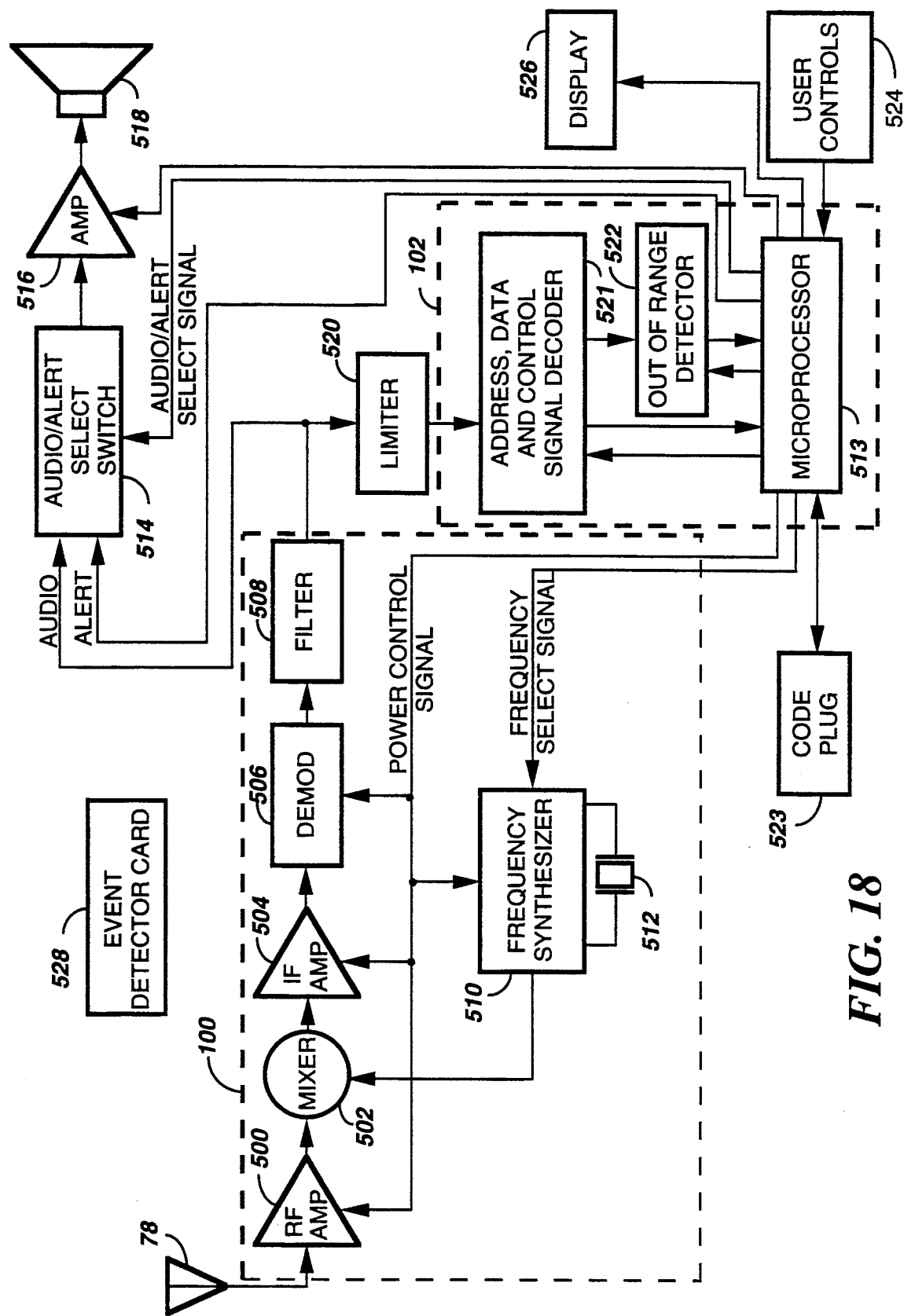
FIG. 18 is a block diagram of the preferred embodiment of a selective call receiver according to the present invention.

Referring next to FIG.18, a block diagram of the selective call receiver 60 according to the present invention is depicted. Selective call radio signals are received by antenna 78 and provided to the receiver circuit 100. The receiver circuit 100 comprises a radio frequency (RF) amplifier 500, a mixer 502, an intermediate frequency (IF) amplifier 504, a demodulator 506, and a filter 508 which demodulates the selective call radio signal in a manner well known in the art. A frequency synthesizer 510 utilizes a reference crystal 512 to generate the two carrier frequencies (wide area and on-site) which are provided to the mixer 502 for demodulation of the selective call signals. Which carrier frequency is generated by the frequency synthesizer 510 is determined by a frequency select signal provided from a microprocessor controller 513 of the selective call decoder/controller 102. The microprocessor 513 also provides a power control signal to the RF amplifier 500, the IF amplifier 504, the demodulator 506 and the frequency synthesizer 510 for implementation of conventional battery saving schemes well known to those skilled in the art.

The demodulated signal is provided to an audio/alert select switch 514 which, when in the audio select mode, provides the demodulated signal to an amplifier 516 and a speaker 518 for presentation of voice messages to the selective call receiver user. The microprocessor 513 provides a second input to the audio/alert select switch 514 which, when the switch 514 is in the alert select mode, provides a signal to the amplifier 516 and the speaker 518 for presentation of an audible alert to the user. Operation of the audio select switch 514 is controlled by an audio/alert select signal from the microprocessor, and and the audio amplifier 516 may be turned on or off by a control signal from the microprocessor 513, thus controlling the broadcast of information by the speaker 518.

To accommodate nonvoice signals, the demodulated signal is also provided to a data limiter 520 and thence to an address, data and control signal decoder 521 of the decoder/controller 102 for decoding. The decoded signal is provided to the microprocessor 513 for processing. The decoded signal is also provided to an out of range detector 522 for determination of whether the selective call receiver 60 is out of range of the signal received on the carrier frequency determined by the frequency synthesizer 510. Many conventional schemes exist for operation of the out of range detector 522. In accordance with the preferred embodiment of the present invention, the out of range detector 522 generates an out of range signal which is provided to the microprocessor 513 in response to nonreception of the on-site preamble within a predetermined time period, the preamble periodically transmitted from the on-site selective call system at predetermined time intervals as described above (FIG. 14). The out of range detector 522 can also provide an out of range signal to the microprocessor 513 in response to detecting that the selective call receiver is out of range of the wide area selective call system signal.

The microprocessor 513 also provides information to and receives information from a code plug 523 which is an electrically erasable programmable read only memory (EEPROM). Information stored in the code plug 523 comprises address and frequency information such as the wide area and on-site selective call addresses and carrier frequencies. As is well known to those skilled in the art, the code plug 523 could also store information necessary for the configuration of various optional features which enhance the operation and/or performance of the selective call receiver. The selective call receiver user controls the operation of the selective call receiver by user controls 524 which provides signals to the microprocessor 513.

The microprocessor 513 provides the decoded signal to a display 526 for visual presentation to the selective call receiver user as instructed by the microprocessor 513. An event detector card 528 such as the NEDAP "Hands-Free" XS Card, manufactured by NEDAP N.V., Groenlo, The Netherlands, is physically coupled to the selective call receiver, yet electrically separate from the operational components of the selective call receiver. The event detector card 528 carries identification information identifying the selective call receiver and interacts with the event detector 111 (FIG. 2) as described above (FIG. 12).

For a more detailed description of the structure and operation of a selective call radio receiver of the type shown in FIG. 18, reference is made to U.S. Pat. Nos. 4,518,961, 4,649,538, and 4,755,816, all commonly assigned to the same assignee as the present invention, and the teachings of which are hereby incorporated by reference.

Referring next to FIGS. 19A, 19B, 19C, 19D, 19E and 19F, operation of the selective call receiver controller 102 according to the present invention begins upon energization of the selective call receiver at which time the microprocessor 513 is initialized 530. The information in the code plug 523 comprising the frequency and address information is read 532 into the microprocessor 513. The microprocessor initially sets the operating mode of the selective call receiver to receive signals on the wide area frequency. Therefore, the wide area carrier frequency is downloaded 534 from the microprocessor 513 to the frequency synthesizer 510 and the wide area system information necessary for the decoder 521 to properly decode the data received (e.g. the signaling protocol used by the wide area system) is downloaded 536 to the decoder 521. System identification information identifying the wide area system 50 is provided 537 to the display 526 (FIG. 18) for presentation to the user. An audible chirp is sounded 537 by briefly activating the audio amplifier 516 and providing a short alert signal to the switch 514 (FIG. 18). In this manner, the user is informed that the selective call receiver 60 is now receiving calls on the wide area frequency. A wide area system flag is set 538 in the microprocessor 513 to indicate the selective call receiver is operating in the wide area operating mode, receiving signals from the wide area selective call network 50.

The out of range detector 522 is initialized by setting an on-site out of range counter to a maximum value 540 and the battery save timer is started 542. The selective call receiver goes into battery saving 544 by the microprocessor 513 shutting down components of the receiver 100 via the power control signal and by shutting down the audio amplifier 516 via the amplifier control signal until battery save timeout. At battery save timeout, the receiver circuit 100 is energized and an attempt is made to decode a selective call message on either the on-site frequency or the wide area frequency as determined 546 by the wide area system flag. While in battery saving, background tasks not essential to the operation of the present invention are also performed 544.

If the selective call receiver 60 is operating on the on-site frequency 546, the on-site decode subroutine 548 is performed by the microprocessor 513 to handle signals received. Alternatively, if the selective call receiver 60 is operating on the wide area frequency 546, the wide area decode subroutine 550 is performed. Processing determines whether the selective call receiver 60 is operating on the on-site frequency or the wide area frequency 546 by examining the wide area system flag in the microprocessor 513. If the wide area system flag is set, the selective call receiver 60 is operating on the wide area system frequency (i.e., the wide area operating mode). If the wide area system flag is not set, the selective call receiver is operating on the on-site system frequency (i.e., the on-site operating mode). After performance of the on-site decode subroutine 548 or the wide area decode subroutine 550 is completed, processing returns to start the battery save timer 542 and perform background tasks waiting for the battery save timeout 544.

Figure 19A:
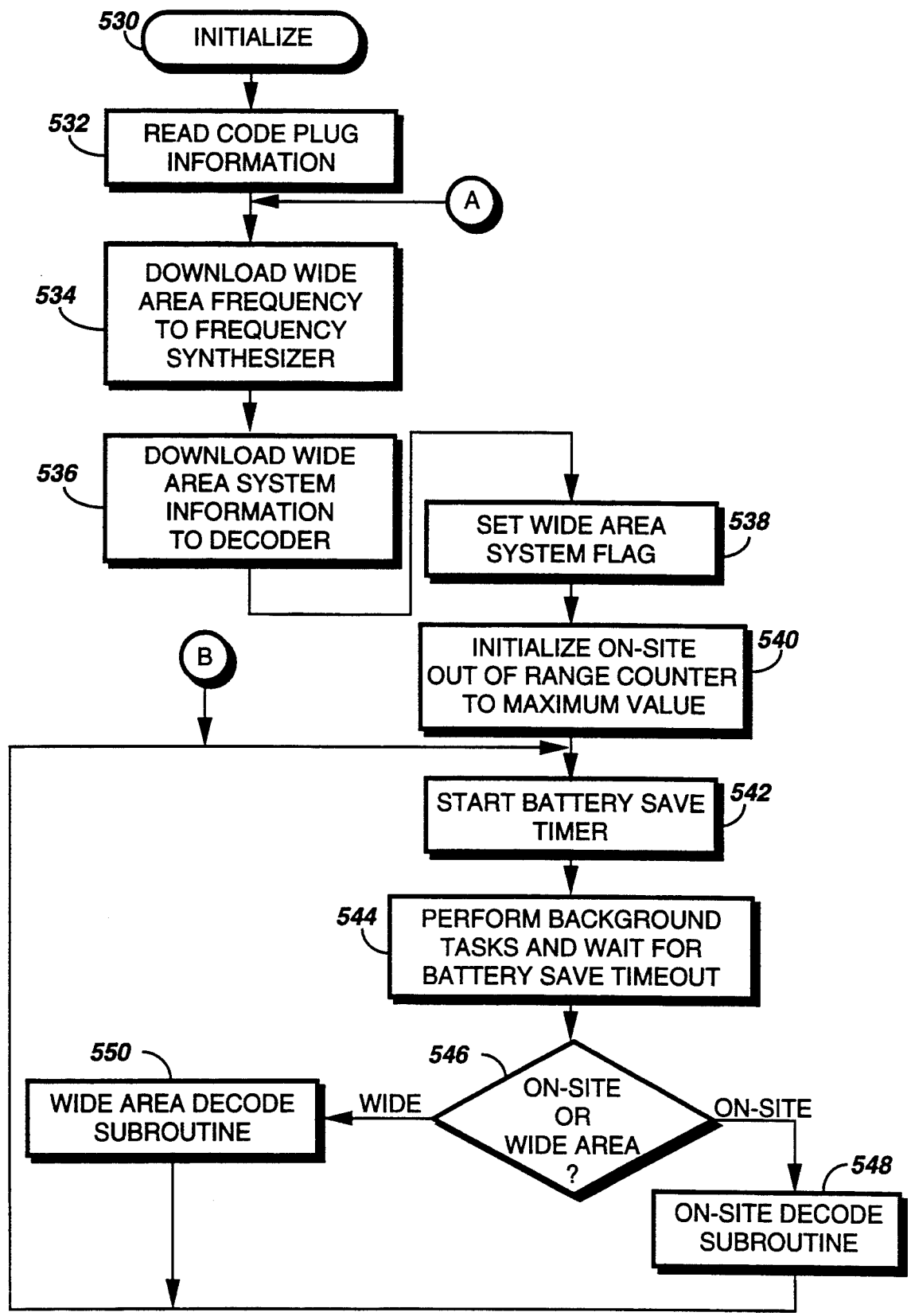
FIG. 19A is a flowchart of the preferred embodiment of the operation of the on-site/wide area decoder of the selective call receiver according to the present invention.
Figure 19B:
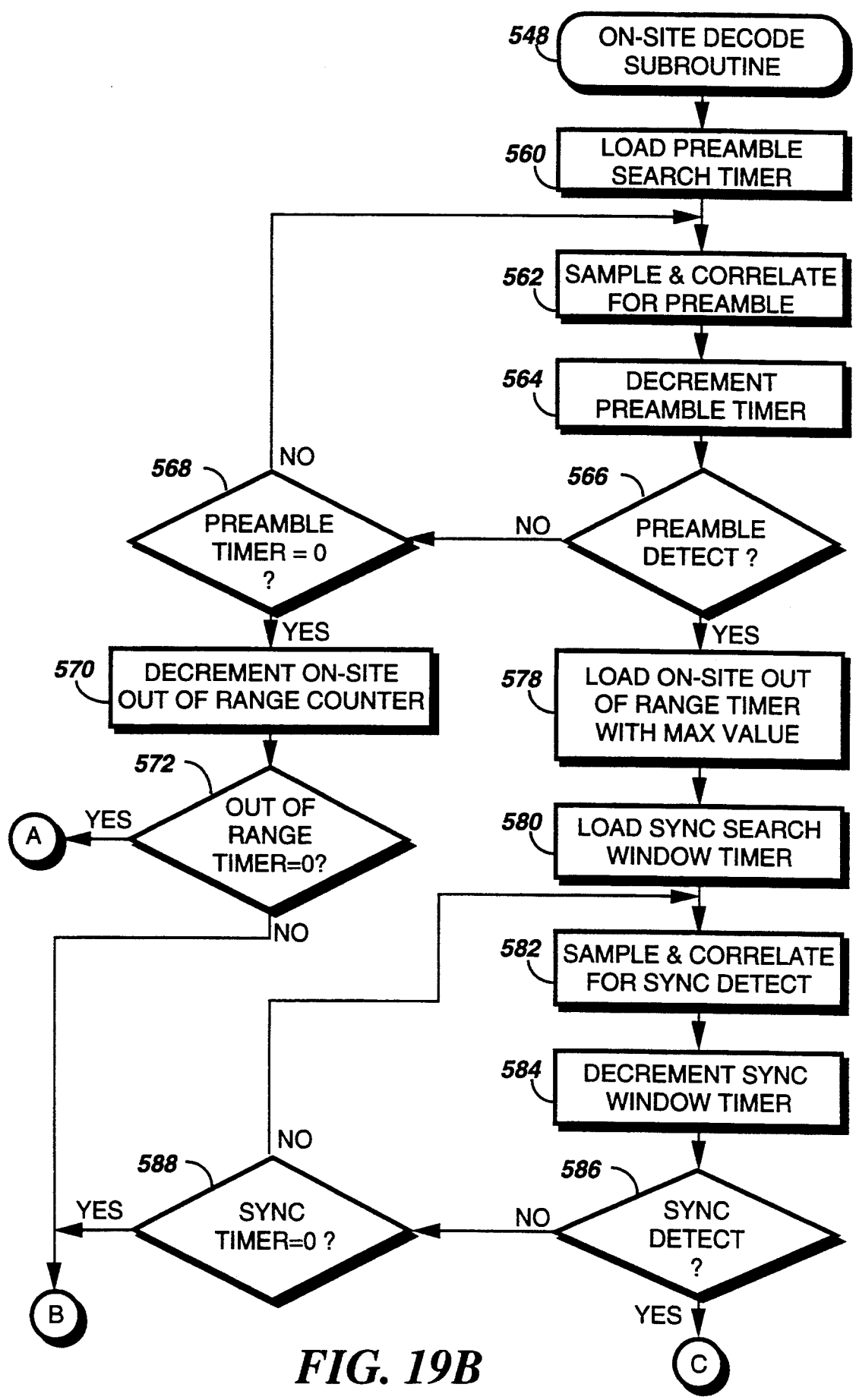
Figure 19C:
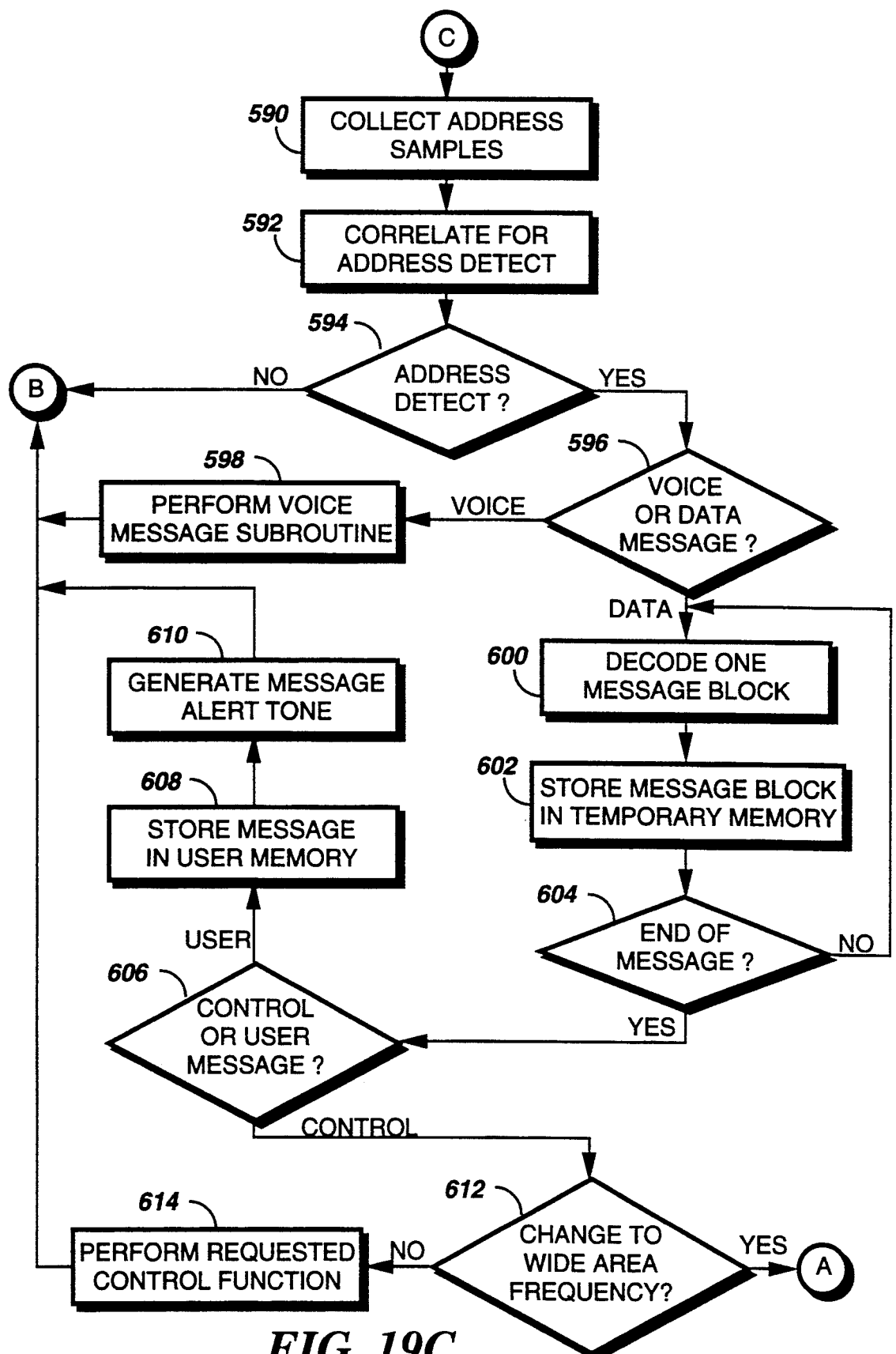

Referring next to FIGS. 19B and 19C, the on-site decode subroutine 548 begins by loading a preamble search timer 560 with a value equivalent to the predetermined time interval for conducting the preamble detect routine. In a conventional manner, the signal is sampled and correlated 562 for preamble detect. After each sample, the preamble timer is decremented 564 and if the preamble has not been detected 566, and the preamble timer does not equal zero 568, processing returns to sample and correlate 562 for preamble detect 566 subsequent portions of the signal. If the preamble is not detected 566 and the preamble timer is decremented to zero 568 indicating the passage of sufficient time for preamble detect, the out of range counter is decremented 570. If the on-site out of range counter equals zero 572, indicating that the preamble has not been detected after a number of predetermined times equal to the maximum number to which the out of range counter was initialized 540, the selective call receiver is declared out of range of the on-site selective call system 55 and the operating mode of the selective call receiver is switched from the on-site operating mode to the wide area operating mode by downloading the wide area frequency to the frequency synthesizer 534 and downloading the wide area system information to the decoder 536. In the preferred embodiment, the maximum value for the out of range detector is thirty-two. If the preamble timer has been decremented to zero 568, yet the out of range counter after being decremented 570 does not equal zero 572, processing starts the battery save timer 542 and performs the background tasks waiting for the battery save timeout 544.

When the preamble is detected 566, the on-site out of range timer is reloaded with the maximum value 578. The signalling code of the preferred embodiment of the present invention has a synchronization (sync) code following the preamble. To detect the sync code, a sync search window timer is loaded 580. In a manner well known to those skilled in the art, the signal is sampled and correlated for sync code detect 582 and the sync search window timer is decremented 584. If sync is not detected 586 and the sync search window timer does not equal zero 588, a next portion of the signal is sampled and correlated 582 for sync detect 586. If the sync search window timer is decremented to equal zero 588 without sync detect 586, processing returns to start the battery save timer 542 and perform background tasks and wait for the battery save timeout 544.

When the sync code is detected 586, address samples are collected 590 and the samples are correlated in a conventional manner for address detect 592 of the selective call receiver on-site selective call address. If an assigned selective call address is not detected 594 processing returns to start the battery save timer 542. If an on-site selective call address for the selective call receiver is detected 594, and the selective call message is a voice message 596, a voice message subroutine 598 is performed. After completion of the subroutine 598, processing returns to start the battery save timer 542 and perform the background tasks while waiting for battery save timeout 544.

If the selective call message is a data message 596, processing decodes the first message block 600 of the message and the decoded message block is stored in temporary memory 602. If the decoded message block does not indicate that it is the last message block of the selective call message (i.e., it is not the end of the message) 604, the next message block is sampled 600 and the decoded message block is stored in the temporary memory 602. Upon the end of the message being detected 604, processing determines whether the message is a control message or a user message 606. If the selective call message is a user message 606, the message, comprising the decoded message block stored in temporary memory, is stored in user memory 608 in a manner well known to those skilled in the art. A message alert tone is generated 610 and processing returns to start the battery save timer 542 and allow the performance of background tasks while waiting for battery save timeout 544.

If, while performing the on-site decode subroutine 548, a control message is received 606, processing determines 612 whether the control message is the predetermined selective call message indicating the selective call receiver 60 should frequency shift to the wide area frequency (i.e., switch operating modes from the on-site operating mode to the wide area operating mode). If the control message is the predetermined selective call message for switching frequencies 612, the selective call receiver switches operating modes by downloading the wide area frequency to the frequency synthesizer 534 and downloading wide area system information to the decoder 536. If the control message is not the predetermined frequency shift control message 612, the requested control function indicated by the control message is performed 614 and processing returns to start the battery save timer 542.

Figure 19D:
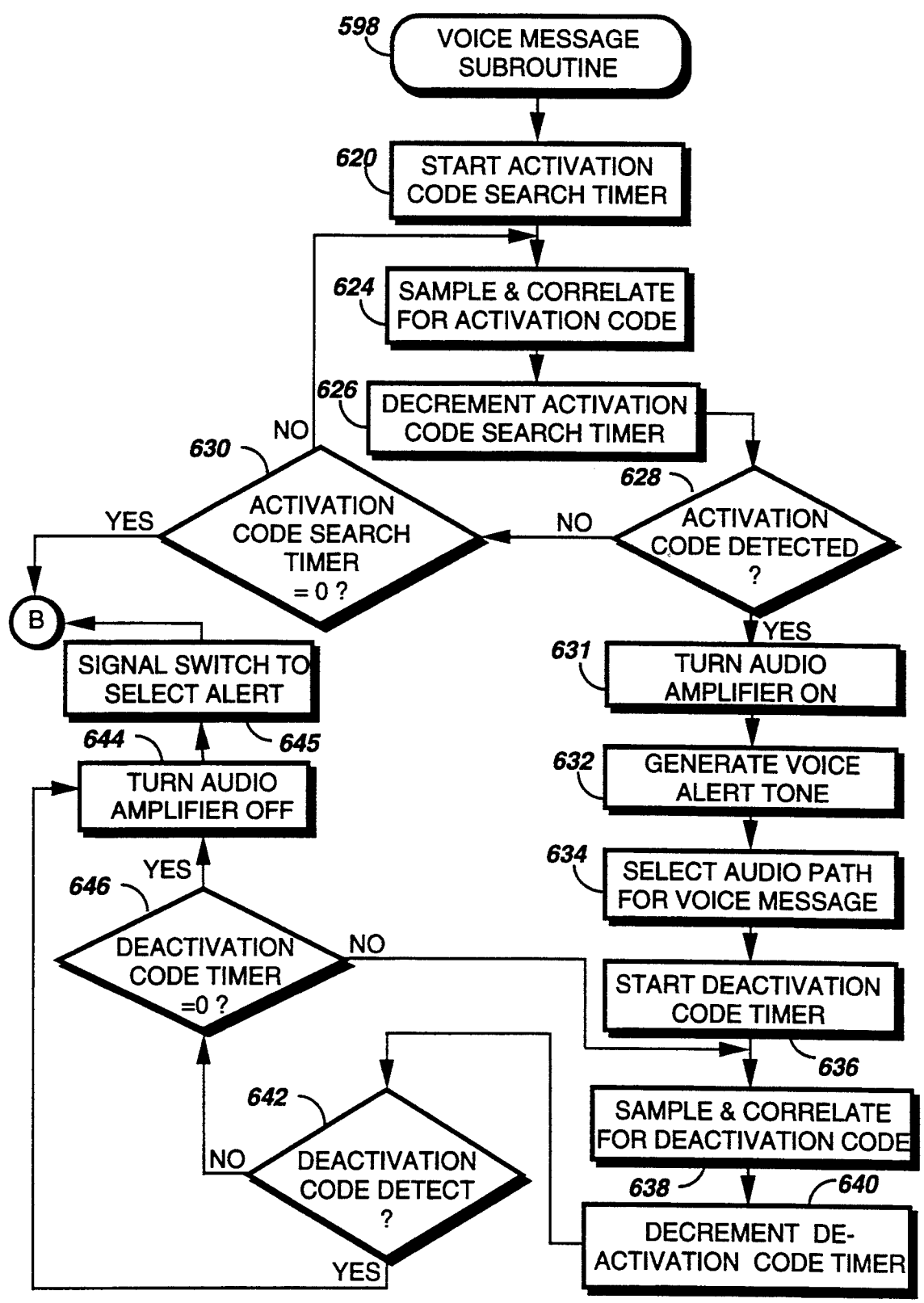

The voice message subroutine 598 of the on-site decode subroutine 548 is depicted in FIG.19D. An activation code search timer is started 620 to allow sufficient time for the decoder 521 and the microprocessor 513 to decode and correlate the activation code in a manner well known to those skilled in the art. The signal is sampled and correlated for the activation code 624. The activation code search timer is decremented 626 and if the activation code is not detected 628, and the activation code search timer does not equal zero 630, a next portion of the signal is sampled and correlated for the activation code 624. If the activation code search timer is decremented to zero 630 without the activation code being detected 628, processing returns to start the battery save timer 542 and wait for battery save timeout while performing background tasks 544.

If the activation code is detected 628, the audio amplifier 516 is turned on 631 and a voice message alert tone is generated 632. A conventional delay of at least a predetermined time is required in the signal between the activation code and the start of the voice message to allow turning on 631 of the audio amplifier 516 (FIG. 18) and generation and presentation of the alert tone 632. It is this required delay which the on-site selective call system of the present invention utilizes to improve throughput by interleaving a data message for another selective call receiver into the signal during the delay. An audio path for the voice message from the receiver circuit through the audio/alert select switch 514 (FIG. 18) to the speaker is opened 634 by appropriate signalling to the audio/alert select switch 514.

As is well known in the art, the voice message is preceded by an activation code and followed by a deactivation code. A deactivation code timer is started 636 and the signal, while being supplied to the audio output, is sampled and correlated for the deactivation code 638 indicating the end of the message. In order to sample the signal, a deactivation timer is decremented 640 for each sampling 638 and processing determines whether the deactivation code is detected 642. If the deactivation code is not detected 642 and the deactivation timer does not equal zero 646, processing continues to sample portions of the signal 638. When the deactivation timer equals zero 646 without detecting the deactivation code 642 the audio amplifier 516 (FIG. 18) is turned off 644, thereby setting a maximum time for a voice message. If the deactivation code is detected 642, indicating the end of the voice message, the audio amplifier 516 is switched off 644. After the audio amplifier is switched off 644, appropriate signalling to the audio/alert select switch 514 returns the switch to the alert path 645. Processing returns to start the battery save timer 542 and perform background tasks and wait for battery save timeout 544.

Figure 19E:
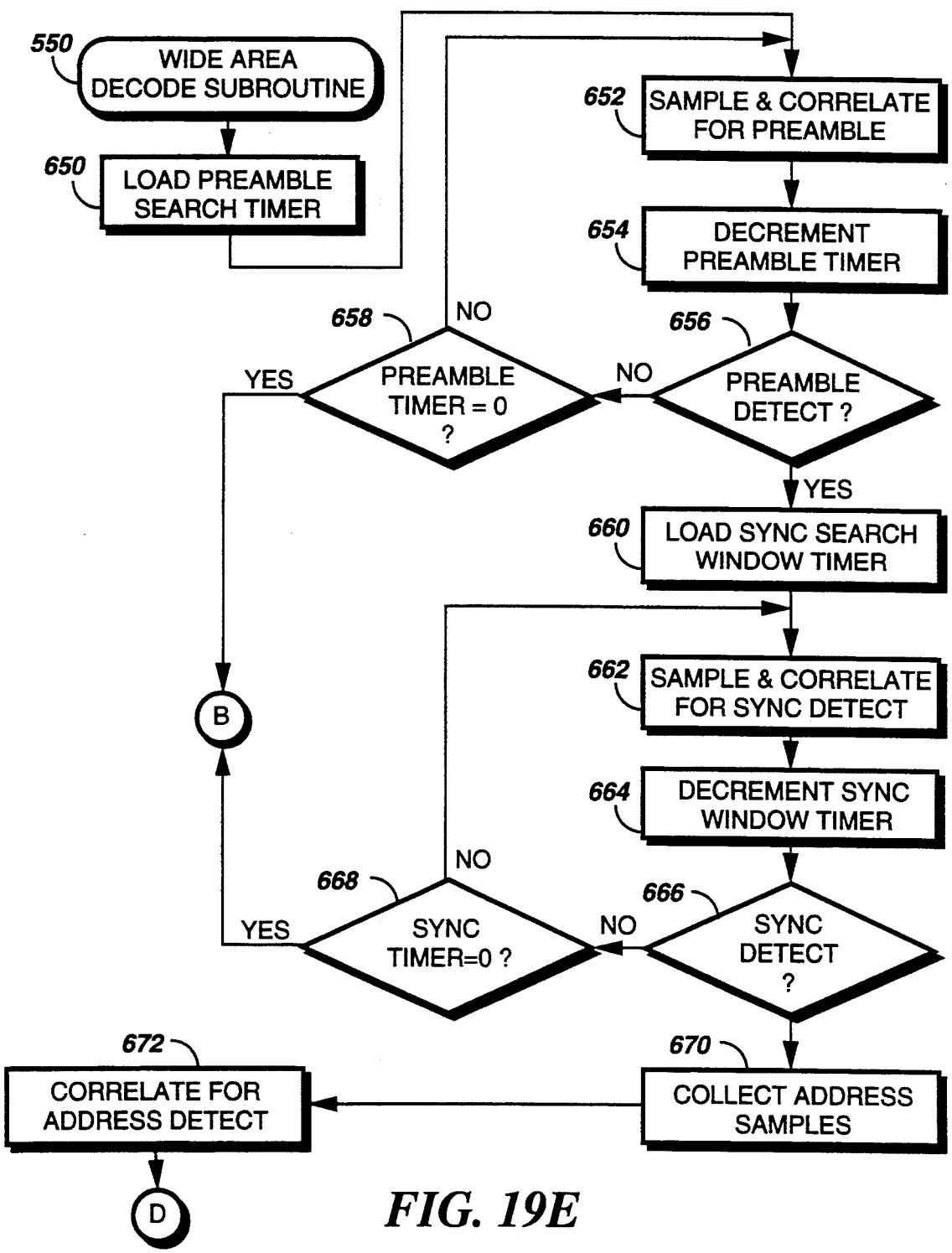
Figure 19F:
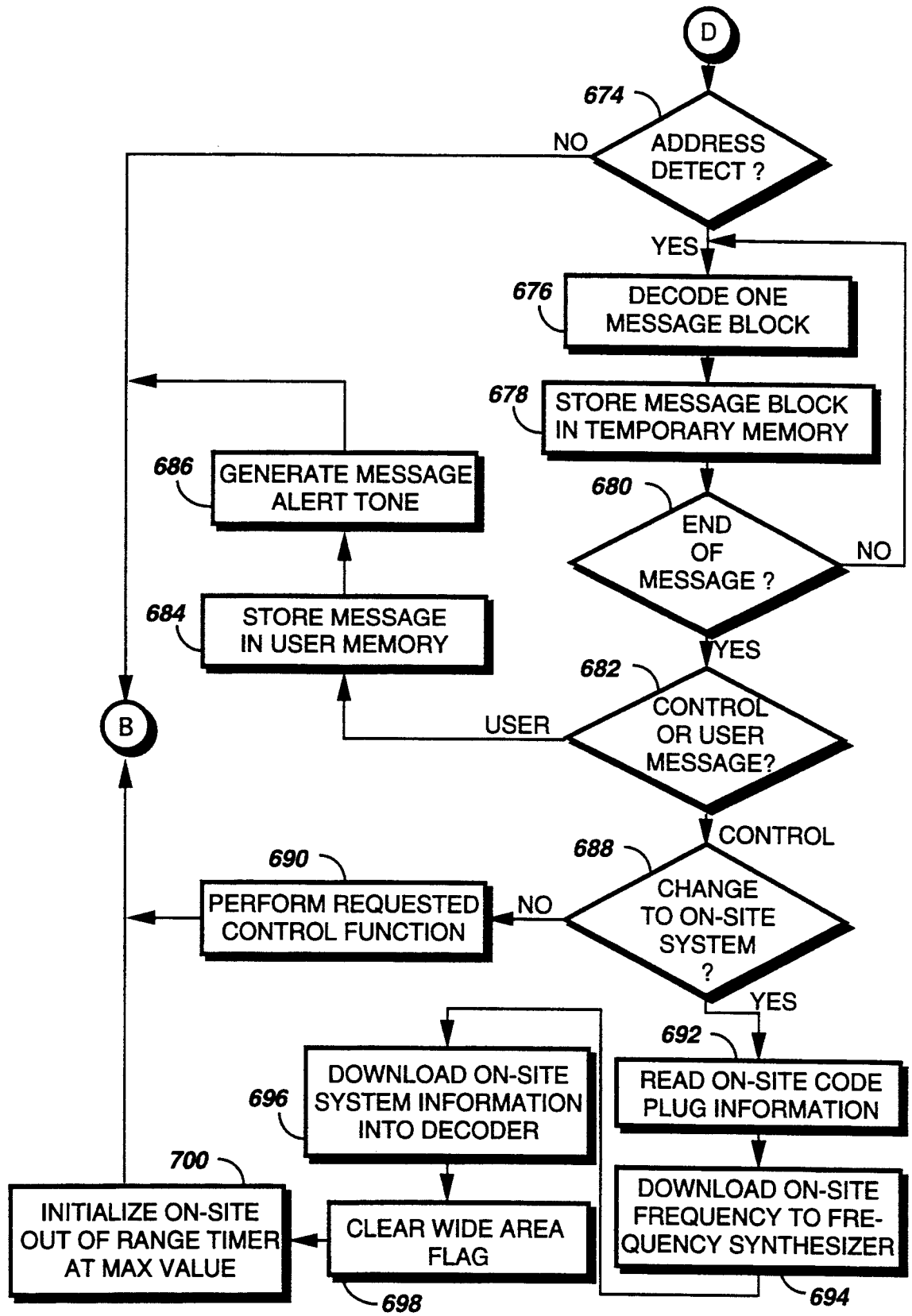

Referring next to FIGS. 19E and 19F, the wide area decode subroutine 550 begins by loading a preamble search timer with a maximum value 650 indicating the length of the preamble in the wide area network system signalling protocol. The preferred embodiment of the present invention utilizes a wide area signalling protocol having a preamble and a synchronization code preceding selective call addresses and corresponding selective call messages well known to those skilled in the art. In a conventional manner, the signal is sampled and correlated for the preamble 652, the preamble search timer is decremented 654 and, if the preamble is not detected 656 and the preamble timer does not equal zero 658, a next portion of the signal is sampled and correlated for the preamble 652. If the preamble timer is decremented to zero 658 without detecting the preamble 656, processing returns to start the battery save timer 542 and perform background tasks 544.

When the preamble is detected 656, a synchronization (sync) code search window timer is loaded 660. The signal is then bit sampled and the bits are correlated for sync code detect 662. The sync window timer is decremented 664 and, if sync is not detected 666 and the sync code timer has not been decremented to zero 668, the next bit is sampled and correlated 662. If the sync search window timer is decremented to zero 668, processing returns to perform background tasks 544.

When sync is detected 666, selective call address samples are collected 670 and correlated for address detect 672 of a wide area address of the selective call receiver. If an address corresponding to the selective call receiver 60 is not detected 674, processing returns to start the battery save timer 542. If the address is detected 674, one message block is decoded 676 and the decoded message block is stored in temporary memory 678. If sampling of the message block does not indicate the end of message 680, the next message block is decoded 676 and stored 678 in temporary memory. When the end of message is detected 680, and if the selective call message is a user message 682, the message is stored in user memory 684 and a message alert tone is generated 686. Processing then returns to start the battery save timer 542, wait for battery save timeout and perform background tasks 544.

It is to be noted that a "message stored in voice mailbox" message provided to the wide area system 50 by the on-site system 55 indicating that a voice message broadcast by the on-site system 55 is stored in the voice mailbox 124 (FIG. 2), would be received by a selective call receiver registered in the on-site registry 96 yet receiving messages on the wide area frequency. When the user reads the message, the user can contact the on-site system to delete the selective call receiver 60 from the on-site registry 96 and retrieve his stored voice message without losing any messages as a result of his failure to remove the listing from the on-site registry 96.

If the selective call message is a control message 682, it is determined whether the control message is the predetermined selective call message instructing the selective call receiver to change from the wide area frequency to the on-site frequency 688. If the control message is not the frequency switching message 688, the requested control function is performed 690 and processing returns to perform background tasks 544. If, on the other hand, the control message instructs the selective call receiver 60 to switch from the wide area operating mode to the on-site operating mode 688 by switching to the on-site frequency, the on-site code plug information is read 692 and the on-site frequency is downloaded 694 to the frequency synthesizer 510 (FIG. 18). The on-site system information is then downloaded into the decoder 696 and information identifying the on-site system 55 is displayed 697 on the display 526 (FIG. 18) and an audible chirp is presented, as described above, informing the user that the selective call receiver is now receiving calls on the on-site frequency. The wide area system flag is cleared 698 indicating that the selective call receiver is operating on the on-site system frequency. The on-site out of range timer is then initialized to its maximum value 700 and processing returns to perform background tasks 544.

By now it should be appreciated that there has been provided an improved interactive dual selective call network system comprising a wide area selective call system, an on-site selective call system and selective call receivers for operating therein. The present invention increases the probability of selective call message reception, increases on-site message throughput by interleaving data and voice messages, and offers automatic frequency shifting to accommodate a user transferring between the two systems.

We claim:

1. In a selective call system having a first selective call network system for transmitting selective call messages on a first channel to a selective call receiver having a predetermined selective call address assigned thereto and capable of operating in a first operating mode and a second operating mode wherein said selective call receiver operating in said first operating mode receives the selective call messages transmitted on said first channel and wherein said selective call receiver operating in said second operating mode receives selective call messages transmitted on a second channel by a second selective call network, the first selective call network system being coupled to the second selective call network via radio frequency link, a method comprising the step of the first selective call network system signaling the second selective call network system to transmit a selective call message to said selective call receiver for switching said selective call receiver from said second operating mode to said first operating mode the selective call message comprising the predetermined selective call address assigned to said selective call receiver and a first predetermined control message, said selective call receiver switching from said second operating mode to said first operating mode in response to receiving said first predetermined control message from the second selective call network system.

2. The method of claim 1 further comprising the step of:
transmitting on said first channel a selective call message comprising said predetermined selective call address and a second predetermined control message, said selective call receiver switching from said first operating mode to said second operating mode in response to said second predetermined control message.

3. In a selective call system having a first selective call network system for transmitting selective call messages on a first channel to a selective call receiver having a predetermined selective call address assigned thereto and capable of operating In a first operating mode and a second operating mode wherein said selective call receiver operating in said first operating mode receives the selective call messages transmitted on said first channel and wherein the first selective call network system is coupled to a second selective call network via radio frequency link and said selective call receiver operating in said second operating mode receives selective call messages transmitted on a second channel by the second selective call network and wherein said first selective call network system comprises a system register for listing active selective call receivers, a method comprising the steps of:
adding said selective call receiver to said system register; and
providing a selective call message on said second channel to said selective call receiver in response to adding said selective call receiver to said system register, the selective call message comprising the predetermined selective call address assigned to said selective call receiver and a first predetermined control message, said selective call receiver switching from said second operating mode to said first operating mode in response to receiving said first predetermined control message from the second selective call network.

4. The method of claim 3 wherein said first selective call network system has associated therewith a first coverage area for transmitting selective call messages therein, and wherein said step of adding said selective call receiver to said system register comprises detecting when said selective call receiver enters said first coverage area.

5. The method of claim 3 further comprising the steps of:
deleting said selective call receiver from said system register; and
transmitting a selective call message on said second channel in response to deleting said selective call receiver from said system register, said selective call message comprising said predetermined selective call address ant a second predetermined control message, said selective call receiver switching from said first operating mode to said second operating mode in response to said second predetermined control message.

6. In a first selective call network system having a first coverage area, a method comprising the steps of:
receiving information for transmittal to a selective call receiver, said selective call receiver having at least one predetermined selective call address assigned thereto;
transmitting a first selective call message comprising said information within said first coverage area;
storing said information in a memory device; and
providing a message to a second selective call network system having a second coverage area for transmittal of a second selective call message from said second selective call network system within said second coverage area, said second selective call message comprising one of the at least one predetermined selective call addresses and a predetermined control message for indicating said information is stored in said memory device.

7. The method of claim 6 wherein said information has a format defined as one of voice format or data format, and wherein said method further comprises, before the step of storing, the step of determining whether said information has a voice format or a data format, and wherein the step of storing said information comprises the step of storing said information if the format is voice format, and wherein the step of providing the message to the second selective call network system comprises the steps of:
providing a message to the second selective call network system having the second coverage area if the format is voice format, a second selective call message transmitted within said second coverage area in response to the message, said second selective call message comprising one of the at least one predetermined selective call addresses and a predetermined control message for indicating said information is stored in said memory device; and providing said information to the second selective call network system for transmittal of a second selective call message within said second coverage area if the format is data format, said second selective call message comprising the one of the at least one predetermined selective call addresses and said information.

8. The method of claim 6 wherein said information has a format defined as one of voice format, alphanumeric format, or numeric format, and wherein said method further comprises, before the step of storing, the step of determining whether said information has a voice format or a data format, and wherein the step of storing said information comprises the step of storing said information if the format is voice format or alphanumeric format, and wherein the step of providing the message to the second selective call network system comprises the steps of:

providing a message to the second selective call network system having the second coverage area if the format is voice or alphanumeric format, a second selective call message transmitted within said second coverage area in response to the message, said second selective call message comprising one of the at least one predetermined selective call addresses and a predetermined control message for indicating said information is stored in said memory device; and providing said information to the second selective call network system for transmittal of a second selective call message within said second coverage area if the format is numeric format, said second selective call message comprising the one of the at least one predetermined selective call addresses and said information.

9. In a first selective call system for broadcasting digital data messages and voice messages preceded by voice alerts having alert time durations, a method for rebroadcasting a selective call message comprising the steps of:

receiving a selective call message, the selective call message transmitted by a second selective call system on a second channel and the selective call message comprising an address and a message;

comparing the address of said selective call message each of a plurality of addresses stored in a system registry;

determining whether said message is a digital data message; and rebroadcasting said message from said first selective call system during one of said alert time durations if said address matches one of said plurality of addresses stored in the system registry and if said message is a digital data message.

10. In a first selective call system for broadcasting selective call messages having a first selective call protocol, a method for rebroadcasting a selective call message comprising the steps of:

receiving a selective call message, said selective call message transmitted by a second selective call system on a second channel and said selective call message comprising an address and a message and having a second selective call protocol;

comparing the address of said selective call message with each of a plurality of addresses stored in a system registry;

changing said message from said second selective call protocol to said first selective call protocol if said address matches one of said plurality of addresses stored in the system registry; and rebroadcasting said message in said first selective call protocol from said first selective call system.

11. A first selective call system for transmitting selective call messages having a first selective call protocol comprising:

receiver means for receiving and decoding a signal transmitted by a second selective call system, said signal comprising a selective call message having an address and a message;

first storage means for storing a plurality of addresses;

comparison means coupled to said receiver means and said first storage means for determining whether said address is one of said plurality of addresses;

translation means coupled to said receiver means and said comparison means for changing said message to said first selective call protocol if said address is one of said plurality of addresses and if said message is not in said first selective call protocol when decoded by said receiver means; and transmission means coupled to said translation means and said comparison means for transmitting said message in said first selective call protocol if said address is one of said plurality of addresses.

12. A first selective call system for transmitting selective call messages having a first selective call protocol comprising:

receiver means for receiving and decoding a signal transmitted by a second selective call system, said signal comprising a selective call message having an address and a message;

first storage means for storing a plurality of addresses;

comparison means coupled to said receiver means and said first storage means for determining whether said address is one of said plurality of addresses; and transmission means coupled to said comparison means and said receiver means for transmitting said selective call message in said first selective call protocol if said address is one of said plurality of addresses, said transmission means comprising interleaving means for broadcasting said message during a voice message alert time of a selective call voice message.

13. A first selective call system comprising:

input means for receiving selective call information;

first signal generation means coupled to means for generating a selective call message in response to said selective call informations, said selective call message comprising a first selective call address uniquely identifying a selective call receiver within said first selective call system;

transmission means coupled to said first signal generation means for transmitting said selective call message;

storage means coupled to said input means for storing said selective call information; and second signal generation means coupled to said storage means for generating a predetermined control signal in response to said storage means storing said selective call information and for providing the predetermined control signal to a second selective call system to generate a selective call message and transmit it therefrom, the selective call message comprising a second selective call address and a predetermined control messages, the second selective call address uniquely identifying said selective call receiver within said second selective call system and the predetermined control message notifying said selective call receiver that said selective call information, is stored in said storage means.

14. A selective call system having a predetermined coverage area comprising:
   system register means for maintaining a listing of selective call receivers;
   input means for receiving selective call information;
   transmission means coupled to said input means and said system register means for transmitting a selective call message for reception by a selective call receiver if the selective call receiver is within the listing of selective call receivers, the selective call message generated in accordance with said selective call information;
   event detection means for detecting when the selective call receiver enters said predetermined coverage area and for detecting when the selective call receiver leaves said predetermined coverage area; and
   system register adjustment means coupled to the event detection means and the system register means for adding the selective call receiver to the listing of selective call receivers if the event detection means detects the selective call receiver entering said predetermined coverage area, and for deleting the selective call receiver from the listing of selective call receivers if the event detection means detects the selective call receiver leaving said predetermined coverage area.

15. A selective call network system having at least a first selective call network system having a first coverage area, comprising:
   means for receiving information for transmittal to a selective call receiver, said selective call receiver having at least one predetermined selective call address assigned thereto:
   means for transmitting a first selective call message comprising said information within said first coverage area;
   a memory device for storing said information; and
   means for providing a message to a second selective call network system having a second coverage area for transmittal of a second selective call message from said second selective call network system within said second coverage area, said second selective call message comprising one of the at least one predetermined selective call addresses and a predetermined control message for indicating said information is stored in said memory device.

16. The selective call network system of claim 15 wherein said information has a format defined as one of voice format or data format, and wherein said network system further comprises, a means for determining whether said information has a voice format or a data format, and wherein said information is stored in the memory device if the format is voice format, and wherein the means for providing the message to the second selective call network system comprises:
   means for providing a message to the second selective call network system having the second coverage area if the format is voice format, a second selective call message transmitted within said second coverage area in response to the message, said second selective call message comprising one of the at least one predetermined selective call addresses and a predetermined control message for indicating said information is stored in said memory device; and
   means for providing said information to the second selective call network system for transmittal of a second selective call message within said second coverage area if the format is data format, said second selective call message comprising the one of the at least one predetermined selective call addresses and said information.

17. The selective call network system of claim 15 wherein said information has a format defined as one of voice format, alphanumeric format, or numeric format, and wherein said network system further comprises, a means for determining whether said information has a voice format or a data format, and wherein said information is stored in the memory device if the format is voice format or alphanumeric format, and wherein the means for providing the message to the second selective call network system comprises:
   means for providing a message to the second selective call network system having the second coverage area if the format is voice or alphanumeric format, a second selective call message transmitted within said second coverage area in response to the message, said second selective call message comprising one of the at least one predetermined selective call addresses and a predetermined control message for indicating said information is stored in said memory device; and
   means for providing said information to the second selective call network system for transmittal of a second selective call message within said second coverage area if the format is numeric format, said second selective call message comprising the one of the at least one predetermined selective call addresses and said information.

* * * * *